US012677034B2

(12) United States Patent
Vaughan et al.

(10) Patent No.: US 12,677,034 B2
(45) Date of Patent: Jul. 7, 2026

(54) AUTOMATED TELECOMMUNICATION SESSION ADJUSTMENT BASED ON IDENTIFIED EMOTIONAL STATES

(71) Applicant: Express Scripts Strategic Development, Inc., St. Louis, MO (US)

(72) Inventors: Moses Vaughan, Nutley, NJ (US); Darwin Romulus, Brooklyn, NY (US)

(73) Assignee: Express Scripts Strategic Development, Inc., St. Louis, MO (US)

( * ) Notice: Subject to any disclaimer, the term of this patent is extended or adjusted under 35 U.S.C. 154(b) by 0 days.

(21) Appl. No.: 18/933,022

(22) Filed: Oct. 31, 2024

(65) Prior Publication Data

US 2026/0122313 A1 Apr. 30, 2026

(51) Int. Cl.
H04N 21/442 (2011.01)
H04N 21/414 (2011.01)
H04N 21/61 (2011.01)

(52) U.S. Cl.
CPC . H04N 21/44218 (2013.01); H04N 21/41407 (2013.01); H04N 21/6181 (2013.01)

(58) Field of Classification Search
None
See application file for complete search history.

(56) References Cited

U.S. PATENT DOCUMENTS

| | | | |
|---|---|---|---|
| 7,639,148 | B2 | 12/2009 | Victor |
| 8,164,464 | B2 | 4/2012 | Matos |
| 8,428,227 | B2 | 4/2013 | Angel |
| 8,687,056 | B2 | 4/2014 | Yahav |
| 9,227,736 | B2 | 1/2016 | Whitlow |
| 9,329,758 | B2 | 5/2016 | Guzak |
| 9,414,250 | B2 | 8/2016 | Froehlich |
| 9,634,855 | B2 | 4/2017 | Poltorak |
| 10,171,877 | B1 * | 1/2019 | Shah .................. H04N 21/4223 |
| 10,481,858 | B2 | 11/2019 | Boulanger |
| 10,535,344 | B2 | 1/2020 | Johnson, Jr. |

(Continued)

OTHER PUBLICATIONS

Amazon, Amazon Rekognition, https://docs.aws.amazon.com/rekognition/latest/dg/rekognition-dg.pdf#API_Emotion, as early as Oct. 12, 2021.

(Continued)

*Primary Examiner* — Alexander Q Huerta
(74) *Attorney, Agent, or Firm* — Jordan IP Law PC

(57) ABSTRACT

Apparatuses, systems, and methods relate to technology to provide first content to a first computing device to be presented on the first computing device as part of a telecommunication session associated with a first use. The technology receives telecommunication data from the first computing device as part of the telecommunication session, identifies a user characteristic of the user based on the telecommunication data, where the user characteristic is associated with the first content presented on the first computing device, further where the user characteristic is one or more of a physical characteristic of the user or an audio characteristic of the user. The technology also measures an emotional response of the user based on the user characteristic, and automatically adjusts a parameter of the telecommunication session based on the emotional response.

17 Claims, 18 Drawing Sheets

(56) References Cited

U.S. PATENT DOCUMENTS

| | | | |
|---|---|---|---|
| 10,694,988 | B2 | 6/2020 | Lee |
| 11,031,013 | B1 | 6/2021 | Myers |
| 2003/0093784 | A1* | 5/2003 | Dimitrova ........ H04N 21/42201 |
| | | | 725/35 |
| 2005/0099492 | A1* | 5/2005 | Orr ........................ H04N 7/147 |
| | | | 348/E7.083 |
| 2006/0088154 | A1 | 4/2006 | Mukhtar |
| 2007/0048707 | A1 | 3/2007 | Caamano |
| 2011/0040155 | A1 | 2/2011 | Guzak |
| 2012/0075122 | A1 | 3/2012 | Whitlow |
| 2012/0165615 | A1 | 6/2012 | Choi |
| 2013/0283162 | A1* | 10/2013 | Aronsson ............. G11B 27/105 |
| | | | 715/719 |
| 2014/0040930 | A1* | 2/2014 | Gates, III ........... H04N 21/4755 |
| | | | 725/13 |
| 2014/0368604 | A1* | 12/2014 | Lalonde ................... H04N 7/15 |
| | | | 348/14.08 |
| 2015/0066523 | A1 | 3/2015 | Pan |
| 2016/0063874 | A1 | 3/2016 | Czerwinski |
| 2018/0295422 | A1* | 10/2018 | Newell .............. H04N 21/8133 |
| 2019/0392204 | A1* | 12/2019 | Anders .................. H04N 7/147 |
| 2022/0303619 | A1* | 9/2022 | Coffing .............. H04N 21/4532 |
| 2024/0013912 | A1* | 1/2024 | Kramer .................. G16H 80/00 |
| 2024/0137237 | A1* | 4/2024 | Griffin ..................... H04N 7/15 |

OTHER PUBLICATIONS

Amazon, Amazon Transcribe, https://aws.amazon.com/transcribe/, as early as Oct. 12, 2021.

Barreto, et al.(Oct. 2007). Non-intrusive physiological monitoring for automated stress detection in human-computer interaction. In International Workshop on Human-Computer Interaction (pp. 29-38). Berlin, Heidelberg: Springer Berlin Heidelberg.

Bylinskii, Z., Borkin, M. A., Kim, N. W., Pfister, H., & Oliva, A. (Oct. 2015). Eye fixation metrics for large scale evaluation and comparison of information visualizations. In Workshop on eye tracking and visualization (pp. 235-255). Cham: Springer International Publishing.

Cutilli CC, Bennett IM. Understanding the health literacy of America: results of the National Assessment of Adult Literacy. Orthop Nurs. Jan.-Feb. 2009;28(1):27-32; quiz 33-4. doi: 10.1097/01.NOR. 0000345852.22122.d6. PMID: 19190475; PMCID: PMC2668931.

Fortune Business Insights, Telemedicine Market, https://www. fortunebusinessinsights.com/industry-reports/telemedicine-market-101067, as early as Oct. 12, 2021.

Giannakakis, et al. (2017). Stress and anxiety detection using facial cues from videos. Biomedical Signal Processing and Control. 31. 89-101. 10.1016/j.bspc.2016.06.020.

Goldberg, J. H., & Kotval, X. P. (1999). Computer interface evaluation using eye movements: methods and constructs. International journal of industrial ergonomics, 24(6), 631-645.

Just, M. A., & Carpenter, P. A. (1976). Eye fixations and cognitive processes. Cognitive psychology, 8(4), 441-480.

Lallé, et al (2016). Prediction of individual learning curves across information visualizations. User Modeling and User-Adapted Interaction, 26(4), 307-345.

Microsoft, Azure Speech in Foundry Tools, https://azure.microsoft. com/en-us/services/cognitive-services/speech-to-text/#overview, as early as Oct. 12, 2021.

Reichenberger, et al. (2020). Gaze behavior in social fear conditioning: An eye-tracking study in virtual reality. Frontiers in psychology, 11, 35.

Salminen, et al. (2019). Confusion Prediction from Eye-Tracking Data: Experiments with Machine Learning. 1-9. 10.1145/3361570. 3361577.

Schwartz, O. (2019). Don't look now: why you should be worried about machines reading your emotions. The Guardian, 6., https:// www.theguardian.com/technology/2019/mar/06/facial-recognition-software-emotional-science.

Zhair, et al. (May 2006). Stress Recognition Using Non-invasive Technology. In FLAIRS (pp. 395-401).

Zimiles, A. (2020). Four new statistics that prove that telemedicine isn't just a pandemic fad. Medical Economics, 97(11). https://www. medicaleconomics.com/view/four-new-statistics-that-prove-that-telemedicine-isn-t-just-a-pandemic-fad.

* cited by examiner

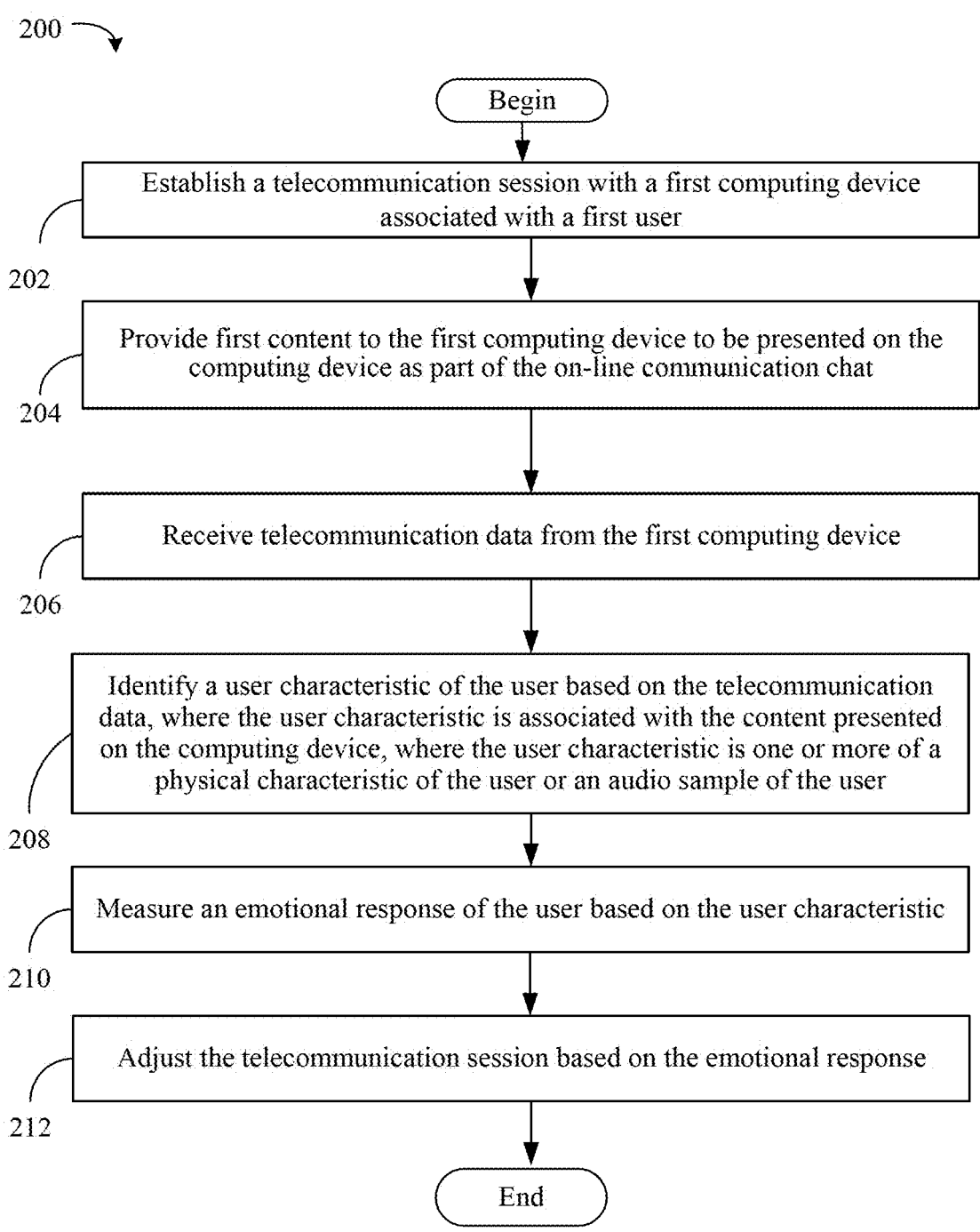

200

Begin

Establish a telecommunication session with a first computing device associated with a first user

202

Provide first content to the first computing device to be presented on the computing device as part of the on-line communication chat

204

Receive telecommunication data from the first computing device

206

Identify a user characteristic of the user based on the telecommunication data, where the user characteristic is associated with the content presented on the computing device, where the user characteristic is one or more of a physical characteristic of the user or an audio sample of the user

208

Measure an emotional response of the user based on the user characteristic

210

Adjust the telecommunication session based on the emotional response

212

End

Figures 8, 9:
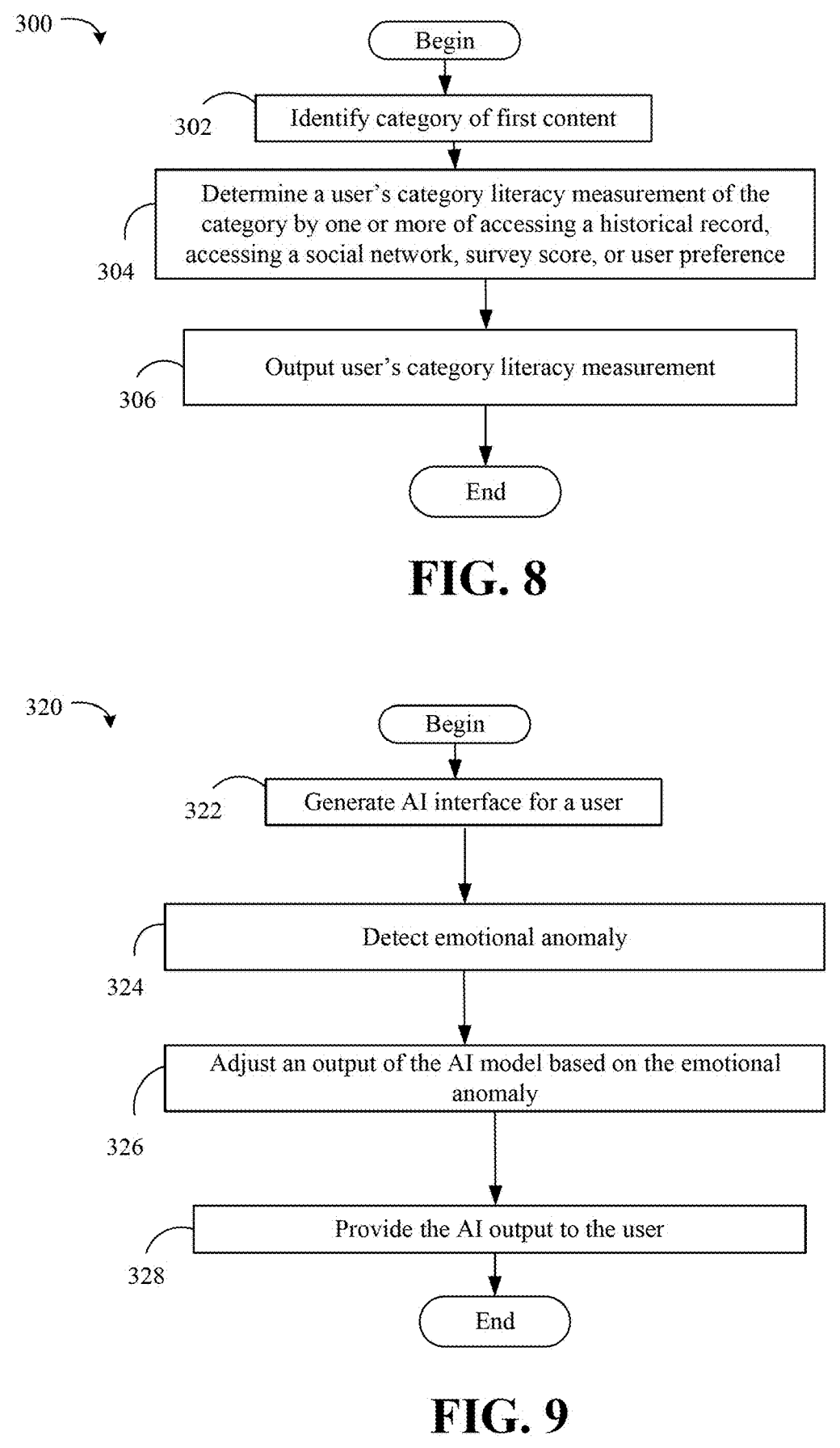

302 Identify category of first content

304 Determine a user's category literacy measurement of the category by one or more of accessing a historical record, accessing a social network, survey score, or user preference 306 Output user's category literacy measurement Begin End

322 Generate AI interface for a user

324 Detect emotional anomaly

326 Adjust an output of the AI model based on the emotional anomaly

328 Provide the AI output to the user

Begin

End

Health literacy scale

| Proficient 310-500 | 500 ↯ 400 350 | — 382  Calculate an employee's share of health insurance costs for a year, using a table that shows how the employee's monthly cost varies demanding on income and family size.<br>— 366  Find the information required to define a medical term by searching through a complex document.<br>— 325  Evaluate information to determine which legal document is applicable to a specific health care situation. |
| --- | --- | --- |
| Intermediate 226-309 | 300 250 | — 290  Determine a healthy weight range for a person of a specified height, based on a graph that relates height and weight to body mass index (BMI).<br>⌐ 266  Find the age range during which children should receive a particular vaccine, using a chart that shows all the childhood vaccines and the ages children should receive them.<br>— 253  Determine what time a person can take a prescription medication, based on information on the prescription drug label that relates the timing of medication to eating.<br>⌐ 228  Identify three substances that may interact with an over-the-counter drug to cause a side effect, using information on the over-the-counter drug label. |
| Basic 185-225 | 200 | ⌐ 202  Give two reasons a person with no symptoms of a specific disease should be tested for the disease, based on information in a clearly written pamphlet.<br>└ 201  Explain why it is difficult for people to know if they have a specific chronic medical condition, based on information in a one-page article about the medical condition. |

FIG. 10

NOTE: The position of a question on the scale represents the average scale attained by adults who had a 67 percent probabiltity of successfully answering the question. Only selected questions are presented. Scale score ranges for performance levels are referenced on the figure.

370

Persona Profile    ⓘ

Name: Kayla

Name: Female    A

Age: 32

Country: United States

About Persona 👍    B    ⓘ

Kayla is a 32 year old female living in United States and works in the Food Preparation and Services field. She likes to read about Politics, Cartoons and Sports on her Mobile. She usually watches about 5.0 minutes of video.

Topics of Interest 👍    ⓘ

More interested Topics

- Topic 1    Related persons
- Topic 2    Related persons
- Topic 3

Less Interested Topics

- Topic 4    Related persons
- Topic 5    Related persons
- Topic 6

FIG. 11A

AUTOMATED TELECOMMUNICATION SESSION ADJUSTMENT BASED ON IDENTIFIED EMOTIONAL STATES

TECHNICAL FIELD

The present disclosure relates to an enhanced system to adjust telecommunication sessions. In detail, examples can automatically adjust parameters of the telecommunication sessions based on emotional states of users.

BACKGROUND

Telecommunications can include an electronic transmission of information over distances for different purposes. Voice telephone calls, text messaging, emailing image sharing, video teleconferences, and/or video sharing can occur over telecommunication networks. Telecommunications are used to organize computer systems into telecommunications networks. These networks themselves can be operated by computers.

BRIEF DESCRIPTION OF THE SEVERAL VIEWS OF THE DRAWINGS

The various advantages of the embodiments of the present disclosure will become apparent to one skilled in the art by reading the following specification and appended claims, and by referencing the following drawings, in which:

FIG. 3 is a flowchart of an example of a method of implementing an enhanced teleservice session according to an embodiment;

FIG. 8 is a flowchart of an example of a literacy measurement identification method according to an embodiment;

FIG. 9 is a flowchart of an example of an artificial intelligence adjustment method according to an embodiment;

DETAILED DESCRIPTION

Figure 1A:
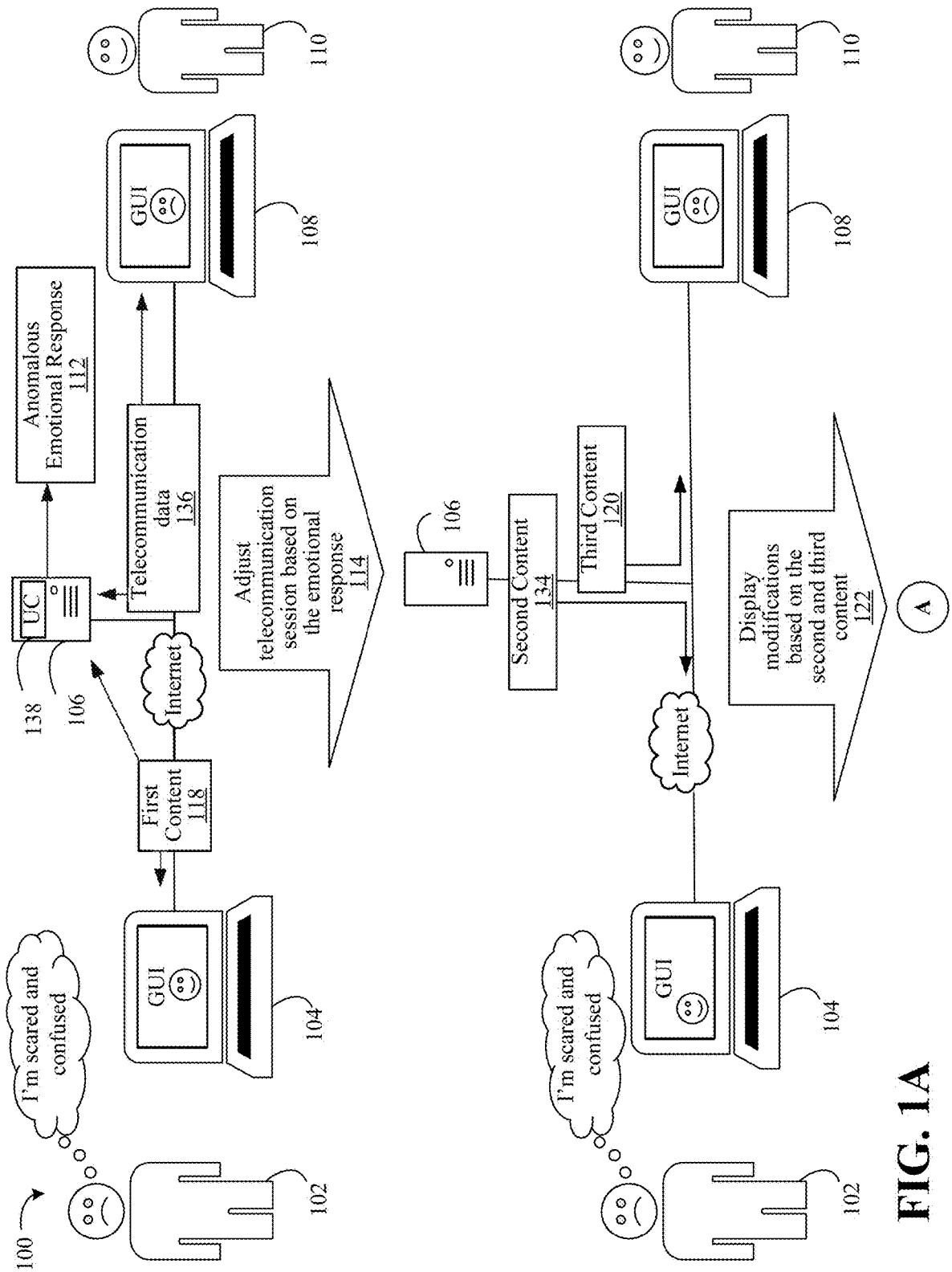
FIGS. 1A and 1B are a diagram of an example of an enhanced teleservice process according to an embodiment.

Examples relate to enhanced and automated sessions based on cutting-edge telecommunication technologies. Teleservices (e.g., the application of telecommunications technology to deliver professional services at a distance) have rapidly increased in size, scope and magnitude as telecommunication infrastructure has developed and due to increased demand. Teleservice can include a service provider and a user. A service provider can be an individual or entity that provides services to another party, such as the user. The user can receive the service from the service provider. Teleservice can provide a more enriching experience than conventional, in-person services under some circumstances.

For example, corona virus disease (COVID) related school closures caused almost 93% of school-age children into distance learning. Further, medicine has undergone a transformative shift into telemedicine. Telemedicine offers significant appeal to both health care providers and patients. For example, patients and health care providers need not be exposed to communicable diseases that may be present in traditional doctor's offices or from other patients, and reduces the amount of resources that each patient utilizes during a visit (e.g., no need to have multiple nurses checking patients in, taking vitals, no need for transportation, large office spaces, etc.). Furthermore, teleservice usage is increasing in multiple fields, such as automotive, computer services, customer support, etc. The teleservice market has thus increased exponentially across a wide swath of fields.

As teleservice has increased in size and scope, several problems have emerged to reduce the quality of teleservice sessions. For example, an in-person experience can allow a service provider to view the entire body of participants to identify body language and facial expressions. Body language and facial expressions provide an intuitive understanding of a user's emotions, and a service provider can adjust aspects of the in-person experience based on the user's emotions. For example, if the service provider notices a particular emotion (e.g., anxious, frightened, etc.), the service provider may respond in a fashion to mitigate the emotion (e.g., adopt different facial expressions, provide further explanation to address fear and/or misunderstanding, change a tone of voice to convey a particular emotion, etc.). Thus, in-person sessions can be effective because the conversations and interactions are intimate and allow a service provider to respond to non-verbalized signs (e.g., physical cues) of the user.

During a teleservice session, a service provider can view a small subset of body language and facial expressions of a user, resulting in miscommunications and an impersonal experience. For example, a user's body language can naturally convey nervousness (e.g., tapping fingers, restless legs, etc.). Such body language is not always apparent during a teleservice session, particularly when a video stream of the user includes only the face of the user and does not include the fingers, legs, etc. Furthermore, the image of the user can appear in low fidelity to a service provider due to various factors (e.g., poor internet connection, inferior computing equipment such as cameras, etc.) causing the face to be obscured and difficult to gauge for emotions. Thus, service providers often times fail to effectively understand the emotions of the user, and respond to the emotions.

Moreover, in some cases the service provider can be an automated computer program that incorporates artificial intelligence (AI) simulating human behavior, human thoughts, human appearance, human guidance, human conversation and/or human vocalizations. While AI can provide powerful analysis, guidance and performance, AI can lack social awareness and understanding of human nature. Thus, AI powered service providers can fail to meet user expectations, and in some cases, fail to accomplish meaningful progress (e.g., AI guidance is misunderstood or not well received) towards an intended goal. Indeed, in some cases AI powered service providers can exacerbate and magnify negative emotions (e.g., confusion, anxiety, anger, etc.) of the user resulting in degraded performance and experiences. Such degraded performances waste compute resources to host the failed teleservice session, increases latency and compute resource consumption since the teleservice can be lengthened to clarify unidentified misunderstandings and mitigate unidentified emotional states (e.g., user asks repeated questions lengthening the teleservice session), the teleservice service fails to address user's goals, increases compute resource usage since multiple teleservice sessions can be scheduled to meet a goal of the user, and can rely on manual (e.g., in-person) interventions when user's goals are not met during the teleservice sessions increasing latency and resource consumption.

As such, unique technological challenges are posed in teleservice computing environments. In order to address the aforementioned challenges, examples analyze a telecommunication session to identify communications between a service provider and a user, and determine emotional states of the user based on the communications. The telecommunication session can be automatically adjusted based on the emotional state of the user to enhance the richness of the telecommunication session, meet the goals of the user, and reduce the time of the telecommunication sessions (e.g., less time needed to identify and address confusion) to reduce compute resources, human resources and obtaining better outcomes. That is, examples provide a holistic framework for the betterment of accessibility to services (e.g., education, medical, customer support, etc.) towards communities around the world. While being applicable to a broad range of scenarios and technological areas, examples remove physical and temporal (e.g., time) barriers to services. The opening of communication channels and strengthening of connections between service providers and patients are enhanced as such implementations become more comprehensive. For example, a telemedical clarity (TMC) system according to examples herein can enhance the long-term cognitive facilities of patients and practitioners to more accurately determine medical options as well as empathize with one another.

Some examples supplement existing telecommunication experiences to account for user recognition and understanding via bridging the communication gap amongst the parties involved. The system will analyze determined patterns of emotions (e.g., confusion, anxiety, fear, sadness, happiness, despondence, etc.) in order to provide clarity and understanding by both parties. As the service provider speaks the system will analyze the user (e.g., a participant) for signs of different emotions and implement various action to mitigate the different emotions.

Examples strive to increase literacy, effectiveness, positive outcomes and provide a novel approach to the enhancement of a service provider's (whether human or AI) cognitive abilities in addition to facilities to more accurately determine service options provided via teleservice session using "people literate service categorizations" to adjust dialogue based on a user's understanding. Examples seek to provide individuals with more accurate context of a telemedical session experience as well as an empathetic feedback loop for service providers (e.g., professionals) across different industries.

Thus, examples improve at least the technical field of telecommunications in real-time and based on an automated analysis of communications using computer-implemented rules and models (e.g., machine learning model). For example, existing telecommunication technology can fail to identify user characteristics and adjust the telecommunication session based on the user characteristics on-the fly and in real-time. Examples herein dynamically adjust the telecommunication sessions to enhance the telecommunication sessions. For example, in order to adjust a telecommunication session in real-time based on emotions, examples, provide first content to a first computing device to be presented on the first computing device as part of a telecommunication session associated with a first user, receive telecommunication data from the first computing device as part of the telecommunication session, identify a user characteristic of the first user based on the telecommunication data, where the user characteristic is associated with the first content presented on the first computing device, where the user characteristic is one or more of a physical characteristic of the user or an audio characteristic of the user, measure an emotional response (e.g., determine whether the user has an emotional anomaly) of the user based on the user characteristic, and automatically adjust a parameter of the telecommunication session based on the emotional response. Turning now to FIG. 1A, an enhanced teleservice process 100 with a service provider 110 (e.g., a second user) is illustrated. In FIG. 1A, a first user 102 seeks professional guidance from the service provider 110. The service provider 110 can be a professional of any type (e.g., mechanic, doctor, therapist, teacher, law enforcement, etc.). The first user 102 can access a first computing device 104, and the service provider 110 can access a second computing device 108 to establish a teleservice session. The first computing device 104 and the second computing device 108 can be any type of computing device (e.g., mobile device, tablet, desktop, laptop, etc.). As illustrated, the first computing device 104 and the second computing device 108 are connected over the internet. It will be understood that the first computing device 104 and the second computing device 108 can be connected over other mediums (e.g., local area network, Bluetooth™, etc.).

The telecommunication session is established so that the service provider 110 can provide services to the first user 102. For example, the second computing device 108 provides a video feed of the service provider 110 that includes video components and audio components. For example, the video feed is transmitted over the internet as first content 118 to the first computing device 104 from the second computing device 108. The first computing device 104 then presents the first content 118 on a first graphical user interface (GUI). Thus, the first content 118 is provided to the first computing device 104 to be presented on the first computing device 104 as part of the telecommunication session established between the first user 102 and the service provider 110.

A server 106 is also part of the enhanced teleservice process 100. The server 106 can receive all (or a subset) communications of the telecommunication process between the first and second computing devices 104, 108 and analyze the communications. For example, the server 106 can also be any other type of computing device (e.g., laptop, mobile device, tablet, etc.). The server 106 can analyze the communications to determine points of emotional anomalies by the first user 102 during the telecommunication session, and automatically execute mitigating actions to address the emotional anomalies.

As illustrated, the face (e.g., visual aspect) of the service provider 110 is provided on the first GUI of the first computing device 104. Additionally, the first computing device 104 can provide an audio feed that corresponds to verbalizations of the service provider 110. The visual aspect and audio of the service provider 110 can be part of the first content 118 transmitted to the first computing device 104.

Thus, the server 106 receives the first content 118. The server 106 can analyze the first content 118 with natural language processing to transcribe the first content 118 (e.g., the audio) into a written and/or printed format. The server 106 can also timestamp the first content 118 (e.g., when certain utterances were stated) to generate the written and/or the printed format in conjunction with time stamps. The server 106 can execute the above in real-time to obtain an accurate transcription of the conversation between the first user 102 and the service provider 110. The transcription can be the written and/or printed format that is time stamped. Similarly, the server 106 can also analyze the telecommunication data 136 (discussed below in more detail), transcribe the telecommunication data 136 into a written and/or printed format and timestamp the written and/or printed format of the telecommunication data 136 to generate the transcription. Thus, the server 106 can have a transcribed and time stamped copy of the entire conversation between the service provider 110 and the first user 102.

The first computing device 104 can capture an audio and video of the first user 102. In particular, the audio and video of the first user 102 can be constantly streamed to the second computing device 108 and the server 106 over the duration of the telecommunication session. The audio and video of the first user 102 is illustrated as the telecommunication data 136. The telecommunication data 136 is then presented on the second computing device 108 as part of a second GUI. The face of the first user 102 is presented on the second GUI of the second computing device 108.

A response of the first user 102 to the first content 118, which was provided by the service provider 110, is therefore captured and transmitted as part of the telecommunication data 136. For example, a portion of telecommunication data 136 includes the first user's reaction to the first content 118.

The server 106 receives the telecommunication data from the first computing device 104, and can analyze the telecommunication data 136 to identify when certain emotions (e.g., emotional anomalies) are displayed. For example, the server 106 can identify a user characteristic (UC) 138 of the first user 102 based on the telecommunication data 136, where the UC 138 is associated with the first content 118 presented on the first computing device 104, and further where the UC 138 is one or more of a physical characteristic of the first user 102 or an audio characteristic of the first user 102. The physical characteristic can include a heart rate of the user 152, pupil dilation of the user 152, breathing rate of the user 152, temperature of the user 152, blood pressure of the user 152 or vocal quality of the user 152. In some examples, user devices (e.g., smartwatch, camera, etc.) can provide the physical characteristic.

The UC 138 can be analyzed to determine an emotional response of the first user 102, and that the emotional response is an anomalous emotional response 112. For example, the server 106 can include a first AI model (e.g., first machine learning model) to determine the emotions (e.g., emotional response) of the first user 102. The user characteristic can be identified based on different features, such as for example audio features. The audio features may include changes in pitch, loudness, timbre, speech rate, and pauses that indicate emotional states. For example, a shaky voice can affect both pitch and volume, and can indicate nervousness. A change in pitch to a higher pitch can indicate nervousness or anxiety. Certain words (e.g., "huh," "oh no," "oh geez") can indicate nervousness, disbelief or lack of understanding (e.g., moment of confusion). Other emotions (e.g., happiness, sadness, etc.) can be conveyed through changes in vocal characteristics and vocabulary. Thus, pitches in voice as well as vocabulary can be analyzed to determine emotions of the first user 102.

Additionally, or instead of, analyzing the vocal characteristics and vocabulary of the first user 102, some examples can also analyze facial features (or other body features) of the first user 102 to determine the emotions of the first user 102. For example, the first AI (e.g., the first machine learning model) can analyze facial characteristics of the first user 102. For example, as will be explained further below eye-tracking features, such as duration spent fixated on an area of interest, pupil dilation (e.g., pupil can dilate when person is frightened or excited), blink rate (e.g., faster blinking can mean anxiety), distance between upper and lower eyelids (e.g., smaller distance can indicate squinting which indicates concentration or disgust). The eye tracking features can be combined with user specific features of age and gender of the first user 102 to achieve significant dependability ratings for emotional identification. For example, an electronic health record, social network profile, publicly available data (e.g., work website, government records, etc.) can be accessed to identify demographic information of the first user 102. In such an instance, the first machine learning model can have several inputs, including the telecommunication data 136 and the demographic information to determine the emotional state of the first user 102.

The emotional state can then be classified as anomalous or not anomalous. For example, suppose that the service provider 110 is a doctor and that the first user 102 is a patient. An emotional anomaly in such a context and technology can be the first user 102 exhibiting confusion and/or fear. As another example, suppose that the service provider 110 is a teacher and that the first user 102 is a student. In such a context and technology, the emotional anomaly can be the first user 102 exhibiting confusion, apathy, apprehension and/or boredom. As another example, suppose that the service provider 110 is a law enforcement officer, and the first user 102 is a person of interest. If the service provider 110 indicates that someone known by the first user 102 has been injured, the emotional anomaly can be the first user 102 exhibiting happiness, joy and/or a positive emotion. Thus, an emotional anomaly is any type of emotion that is identified as being unexpected, undesirable and/or unacceptable (e.g., patient is confused about diagnosis) based on the nature of the conversation.

In some examples, the server 106 can be programmed ahead of time to identify which emotions are considered anomalies based on a context and/or subject matter of a conversation. For example, the server 106 can be programmed to determine that in an educational context, the emotional anomaly is confusion, apathy, apprehension and/or boredom. In a law enforcement context, the emotional anomaly can be the first user 102 exhibiting happiness, joy and/or a positive emotion. In a medical context the emotional anomaly can be confusion and/or fear.

In some examples, the server 106 can analyze the transcription of the conversation and determine if a particular emotion is appropriate or inappropriate. For example, different conversations can have various inflection points, whether in positive or negative directions, and thus the expected emotions (as well as anomalous emotions) can vary. For example, a second AI (e.g., a second machine learning model) can be trained based on input conversations, and anomalous emotions. In doing so, the second machine learning model can be trained to identify whether an anomalous emotion is exhibited based on the context (e.g., field of service) and dialogue of a conversation.

Thus, the server 106 can measure an anomalous emotional response 112 (e.g., identify an emotion and determine if the emotion is anomalous) of the first user 102 based on the UC 138. Additionally, the server 106 can automatically adjust the telecommunication session based on the anomalous emotional response 112, 114 (e.g., mitigate the anomalous emotional response). In this example, the emotional response is determined to be scared and confused, and the emotional response is classified as an anomalous emotional response 112 (e.g., is classified as being anomalous based on the context of the conversation).

For example, the server 106 can generate second content 134 (e.g., mitigation information) to be provided to the first computing device 104 and the first user 102, and can generate third content 120 (e.g., mitigation information) to be provided to the second computing device 108 and the service provider 110. The third content 120 can be an instruction to generate an augmented overlay on the second GUI of the second computing device 108 to notify the service provider 110 of the anomalous emotional response 112, or that the first user 102 is confused and scared.

Figure 1B:
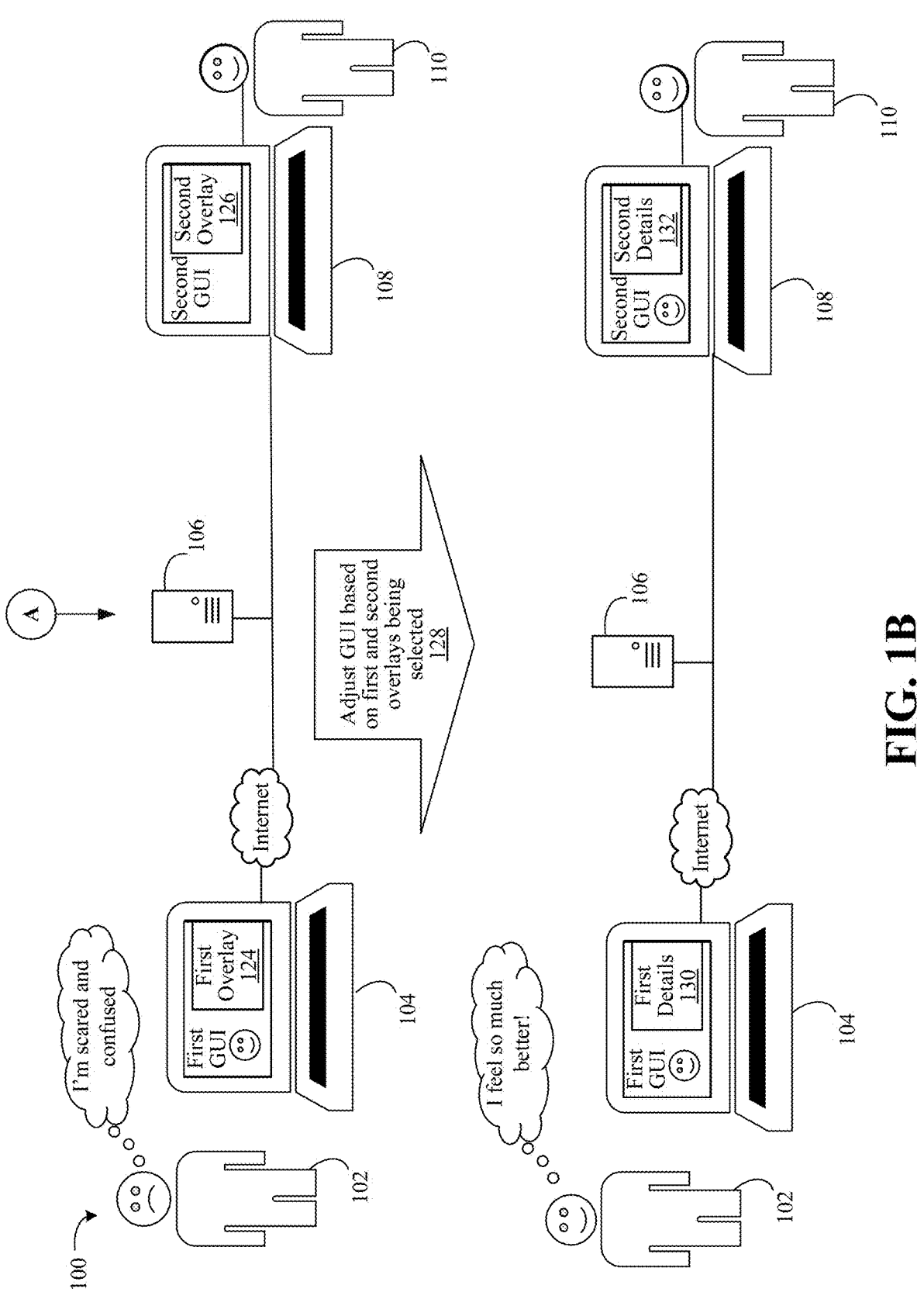

That is, turning now to FIG. 1B, examples display modifications based on the second and third content 122. A first overlay 124 (e.g., a calming and clarification button) can be presented and a second overlay 126 (e.g., a calming and clarification button) can be presented. That is, the enhanced teleservice process 100 can display modifications based on the second and the third content 134, 120 to adjust a parameter of the teleservice session.

The enhanced teleservice process 100 then adjusts the first and second GUIs based on the first and second overlays being selected 128. For example, first details 130 (e.g., calming details, clarification details, etc.) can be presented. Second details 132 (e.g., notification of portions of the conversation that caused anxiety and sadness, clarification statements to clarify the portion of the conversation) can also be presented to the service provider 110 for future reference.

The second content 134 can be clarification information for the first user 102. For example, the server 106 can identify when the anomalous emotion occurs. The server 106 can determine from the time-stamped transcription of the conversation between the first user 102 and the service provider 110, a corresponding portion of the conversation that caused the anomalous emotional response 112. For example, if the anomalous emotional response 112 occurs at a certain time period, a portion (e.g., 20 seconds) of the conversation that ends a preceding amount of time (e.g., 3 seconds) prior to the anomalous emotional response 112 being detected can be identified from the transcription and analyzed for clarification.

So for example, suppose that the anomalous emotional response 112 is detected at time T. A portion of the conversation at time T minus 3 seconds to time T minus 23 seconds would be analyzed.

The portion of the conversation can then be translated into an easier to understand format for the first user 102. For example, the server 106 can identify a category of the conversation (e.g., medical, mechanical, math, social studies, etc.). The server 106 can determine a level of understanding of the category by the first user 102. For example, the server 106 can access a historical database of the first user 102 (e.g., previous grades or evaluations of the level of understanding if the conversation is related to teaching, survey related answers, etc.) to identify a technical proficiency of the first user 102 with respect to the category. Thus, the server 106 can identify a category of the first content 118, determine a level of understanding of the category by the first user 102, determine one or more of second content 134 to be presented to the first user 102 based on the level of understanding and the UC 138, or third content 120 to be presented to the service provider 110 associated with the telecommunication session based on the level of understanding and the UC 138, and provide one or more of the second content 134 to the first computing device 104, or the third content 120 to the second computing device 108 associated with the service provider 110.

The server 106 can then access a synonym map to determine synonyms of words in the portion that could potentially cause confusion. For example, the server 106 can identify terms in the portion of the conversation that have synonyms in the synonym map, and replace the terms with the synonyms. The synonyms can also be identified based on the level of understanding of the category by the first user 102. For example, different synonyms can correspond to different levels of understanding. An appropriate synonym can be identified based on the level of understanding of the first user 102, and the corresponding levels of understanding associated with the synonym (explained further below).

The server 106 can also rephrase the portion to simplify and remove extraneous terms (e.g., fillers, sentences identified as being irrelevant, etc.). As such, the server 106 can generate clarification information that is succinct and understandable for the first user 102.

That is, the server 106 can timestamp the detected anomalous emotion (e.g., moment of confusion (MOC)/moment of anxiety (MOA)). In the case of confusion being detected the second content 134 can be an instruction and data to provide an augmented overlay (e.g., a clarity button) such as the first overlay 124 (FIG. 1B) on the first GUI of the first computing device 104 notifying the first user 102 that a lack of understanding appears to be present, and offering clarification. Upon the clicking of the first overlay 124, the first user 102 would then receive a more simplified transcription either in textual or verbal context as preferred by the first user 102. The service provider 110 will also be notified of the first user's 102 request for "clarity," and a transcription of the portion of the conversation which was identified as benefiting from clarity. The service provider 110 can then supplement the information or provide additional context to the first user 102.

When anxiety is detected, the third content 120 can further contain an instruction to generate an augmented overlay (calming button), such as second overlay 126 (FIG. 1B), on the second GUI of the second computing device 108 notifying the service provider 110. For example, the second overlay 126 can suggest that empathy be given for the first user 102 as the first user 102 appears to be anxious. Upon selecting the calming button, the service provider 110 would then receive a transcription either in textual or verbal context of the portion of the conversation that caused the anxiety. The portion can be identified similarly to as above. For example, if anxiety of the anomalous emotional response 112 occurs at a certain time period, a portion (e.g., 20 seconds) of the conversation that ends a preceding amount of time (e.g., 3 seconds) prior to the anomalous emotional response 112 being detected can be identified from the transcription and analyzed for anxiety calming measures.

For example, the second content 134 can also be an instruction to provide a calming button on the first GUI of the first computing device 104. When the first user 102 selects the calming button, calming facts (e.g., prognosis is good for a medical diagnosis, your progress has been great, this topic is hard to master, etc.), actions (e.g., let's take a quick break, let's meditate, etc.) or images can be provided to the first user 102 to calm the first user 102.

The first and second GUIs can be adjusted based on the first overlay 124 and the second overlay 126 being selected. Selection of the first and second overlays 124, 126 can cause first details 130 and second details 132 to be displayed. For example, the first details 130 can be a more simplified transcription either in textual or verbal context as preferred by the first user 102 to mitigate the confusion of the first user 102 (described above). Further, the first details 130 can include calming facts to calm the first user 102. The second details 132 can suggest that empathy be given for the first user 102 as the first user 102 appears to be anxious (described above). Thus, example can provide one or more of a first overlay 124 on a first graphical user interface of the first computing device 104 that corresponds to the second content 134, or provide a second overlay 126 on a second graphical user interface of the second computing device 108 that corresponds to the third content 120.

Figure 2:
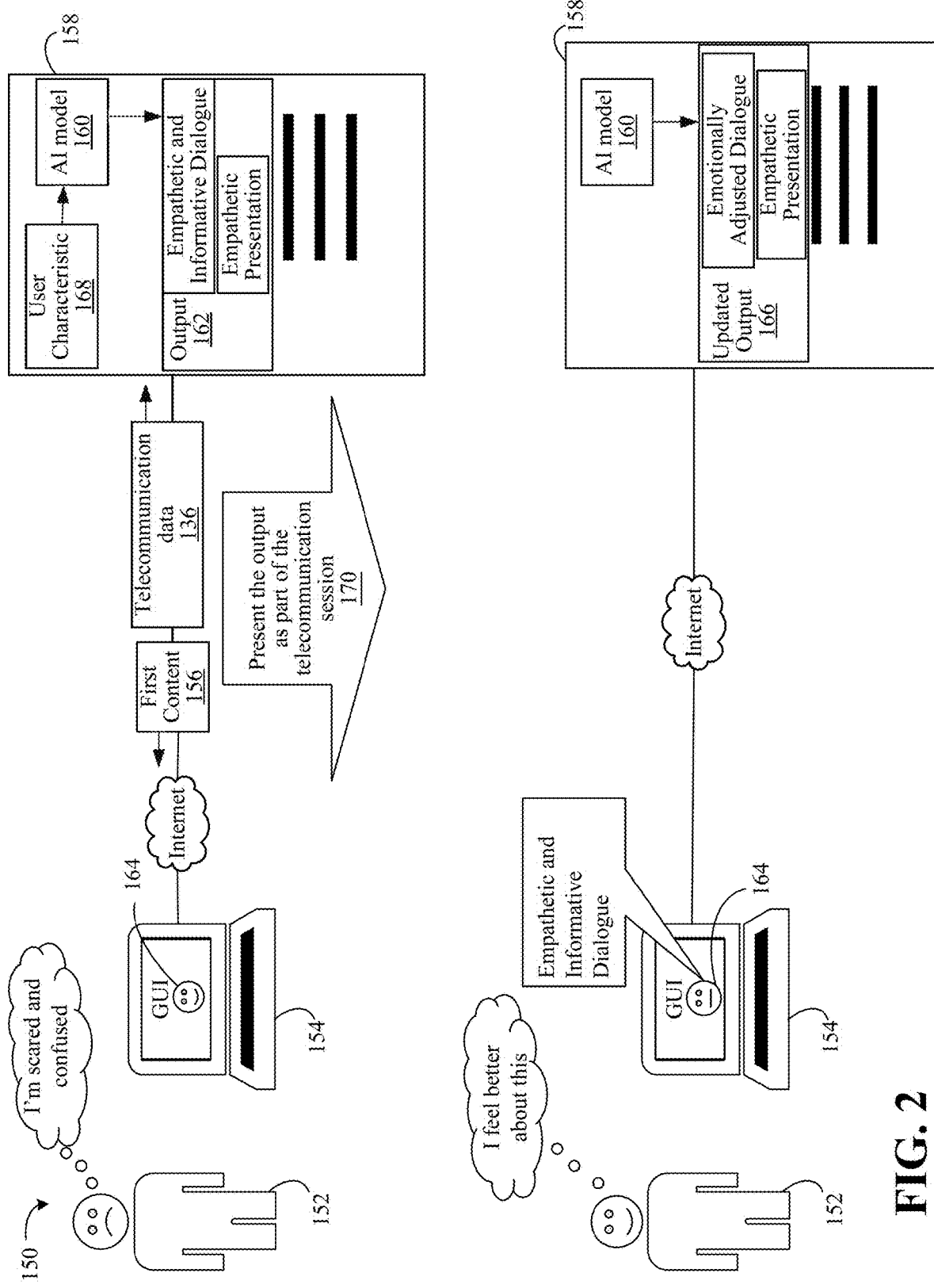
FIG. 2 is a diagram of an example of an artificial intelligence based teleservice process according to an embodiment.

It will also be understood that the service provider 110 can be replaced with an AI model, as discussed below with respect to AI-based teleservice process 150 (FIG. 2).

The network(s) connecting the first computing device 104, the second computing device 108 and the server 106 can include, or operate in conjunction with, an ad hoc network, an intranet, an extranet, a virtual private network (VPN), a local area network (LAN), a wireless network, a low energy Bluetooth (BLE) connection, a WiFi direct connection, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network can include a wireless or cellular network and the coupling can be a Code Division Multiple Access (CDMA) connection, a Global System for Mobile communications (GSM) connection, or other type of cellular or wireless coupling. In this example, the coupling can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

Aspects of the enhanced teleservice process 100 can be implemented be implemented in logic instructions (e.g., software), configurable logic, fixed-functionality hardware logic, computer readable instructions stored on at least one non-transitory computer readable storage medium that are executable to implement the enhanced teleservice process 100, circuitry, etc., or any combination thereof. The enhanced teleservice process 100 can be a computing architecture, in which any of the components are executed in logic instructions (e.g., software), configurable logic, fixed-functionality hardware logic, computer readable instructions stored on at least one non-transitory computer readable storage medium that are executable to implement on the enhanced teleservice process 100, circuitry, etc., or any combination thereof.

Turning now to FIG. 2, an AI-based teleservice process 150 is illustrated. The AI-based teleservice process 150 can generally be implemented in conjunction with any of the embodiments described herein, for example the enhanced teleservice process 100 (FIGS. 1A-1B). Similar aspects to the enhanced teleservice process 100 (FIGS. 1A-1B) are omitted for the sake of brevity, but it will be understood that aspects of AI-based teleservice process 150 can be implemented similarly to corresponding aspects of the enhanced teleservice process 100 (FIG. 1A-1B).

In FIG. 2, a server 158 can interact with a computing device 154 of a user 152. The server 158 can execute an AI model 160 (e.g., a second user) that simulates human behavior and guidance. In some examples, the server 158 includes more than one server that executes the AI model 160.

The AI model 160 can be trained to operate as a service provider in this example. For example, the AI model 160 can simulate human guidance, appearance and presentation (e.g., visual and voice) via a humanlike digital actor 164. In some examples, the humanlike digital actor 164 can be augmented and/or replaced with a chatbot. In this example, the AI model 160 (e.g., a generative AI model) can generate the humanlike digital actor 164 (e.g., an AI avatar video model) that is displayed on the computing device 154. The humanlike digital actor 164 can simulate human appearance and dialogue. The humanlike digital actor 164 can be a photorealistic presenter video that combines images with text to convey information to the user 152.

For example, the server 158 can provide first content 156 to the computing device 154. The first content 156 can be an instruction to present the humanlike digital actor 164 along with corresponding dialogue and audio. For example, the instruction can cause the humanlike digital actor 164 to discuss a certain topic along with a corresponding video that is synchronized with a discussion of the topic (e.g., lips move in correspondence with the dialogue). The instruction can therefore be an instruction to combine images with text to simulate a human speaking as a video.

The computing device 154 can provide telecommunication data 136 to the server 158. The telecommunication data 136 can include an audio feed and/or a video feed of the user 152. The server 158 can then identify the UC 168 (similarly to as described above in the enhanced teleservice process 100) from the telecommunication data 136. For example, the UC 168 can include one or more of a physical characteristic (e.g., distance between upper and lower eyelids, mouth expressions, eyebrow positioning, pupil diameter, etc.) of the user 152, or an audio sample of the user 152 that is analyzed to detect emotional states of the user 152.

Existing AI models can provide information to users without considering the emotions of the users. As such, existing AI models lack the ability to respond to human emotions and adjust dialogue based on the human emotions. In doing so, the existing AI models can actually exacerbate problems of the users and cause greater levels of confusion and negative emotions (e.g., sadness, anger, frustration, etc.). Further, the existing AI models can consume elevated amounts of compute resources since users can spend a significant amount of time seeking clarification or further guidance from the existing AI models through verbal or written communications. Further, users can have difficulty identifying the correct prompt to guide the AI models to provide a satisfactory explanation. Thus, existing AI models can fail to provide meaningful guidance in a concise, efficient and understandable manner. The AI model 160 is enhanced and implements a new functionality of at least responding to human emotions and adjusting dialogue based on the human emotions.

The AI model 160 is previously trained based on UCs to be responsive to UCs, and in particular identify emotional states of users based on UCs. The AI model 160 can adjust the humanlike digital actor 164 based on the emotional states of the users. Therefore, the AI model 160 can provide further explanations and/or clarifications to users in real-time when a particular emotional state (e.g., confusion) is detected reducing the overall time of a telecommunication session, compute resources and providing better outcomes for users. Thus, the AI model 160 can consume significantly lower compute resources than conventional AI models, and additionally achieve higher rates of satisfaction and success.

In this example, the AI model 160 can receive the UC 168 as an input. The AI model 160 can adjust the humanlike digital actor 164 based on the UC 168. For example, as noted above, the UC 168 can correspond to an emotional state of the user 152. In such a case, the AI model 160 can dynamically adjust in real-time based on the UC of the user 152 to respond to an emotional state of the user 152. In some examples, another AI model (not illustrated) can receive the UC 168, and determine an emotional state of the user 152 based on the UC 168 similarly to as described above in enhanced teleservice process 100. The emotional state can then be provided as an input to the AI model 160.

The AI model 160 can be trained to detect and respond to various detected emotions. For example, emotions can include apathy, happy, sad, angry, confused disgusted, surprised, calm unknown and fear. For example, if emotions of unknown, fear and/or anxiety are detected, the AI model 160 can expand upon the tone of voice of the humanlike digital actor 164, and implore and/or calm the user 152 to focus on crucial and/or non-crucial information. Further, the AI model 160 can provide dialogue to convey to the user 152 that the user 152 should not focus on a non-primary concern which has a low likelihood of occurrence. In another example, if the conversation is about a serious topic and the emotional response is inattentiveness and/or apathy, the AI model 160 can generate a recommendation and/or emotional response to encourage the user 152 to have more concern (e.g., study habits, medical prognosis and corresponding lifestyle changes, medical interventions, etc.). In doing so, the AI model 160 can cause dramatic emotional shifts in the user 152 to obtain better outcomes. For example, the negative emotions of the user 152 can change to positive or neutral emotions. Furthermore, doing so reduces the amount of the compute resources that the telecommunication session utilizes, since the user 152 can be quickly guided to relevant answers and the AI model 160 can pre-emptively address potential concerns of the user 152.

In this example, the UC 168 corresponds to the emotional state of the user 152 being scared and confused. The AI model 160 can then generate an output 162 to include empathetic and informative dialogue guiding the user 152 to a positive emotional state, as well as an empathetic appearance. For example, a facial expression and tone of the humanlike digital actor 164 can be controlled to mimic empathy. The informative dialogue can reduce the emotional state of being scared, while the empathetic dialogue and appearance can mitigate the confusion of the user 152. The informative dialogue can be identified similarly to as described above in enhanced teleservice process 100 (e.g., identify a moment of confusion or moment of other anomalous emotion, determine corresponding portion of the conversation or dialogue that caused the anomalous emotion or moment of confusion, access a synonym map, identify a level of understanding of the first content by the user 152, adjust the portion based on the synonym map and the level of understanding, and cause the adjusted portion to be presented to the user 152).

The AI-based teleservice process 150 can then include presenting output 162 as part of the AI-based teleservice process 150, 170. The output 162 is provided to the computing device 154 to be presented. As a consequence, the humanlike digital actor 164 can express the empathetic and informative dialogue, and adopt an empathetic appearance. For example, the humanlike digital actor 164 can change from a smiling face to a more neutral expression. Furthermore, vocal characteristics of the humanlike digital actor 164 can change into an empathetic tone of voice.

Figure 14:
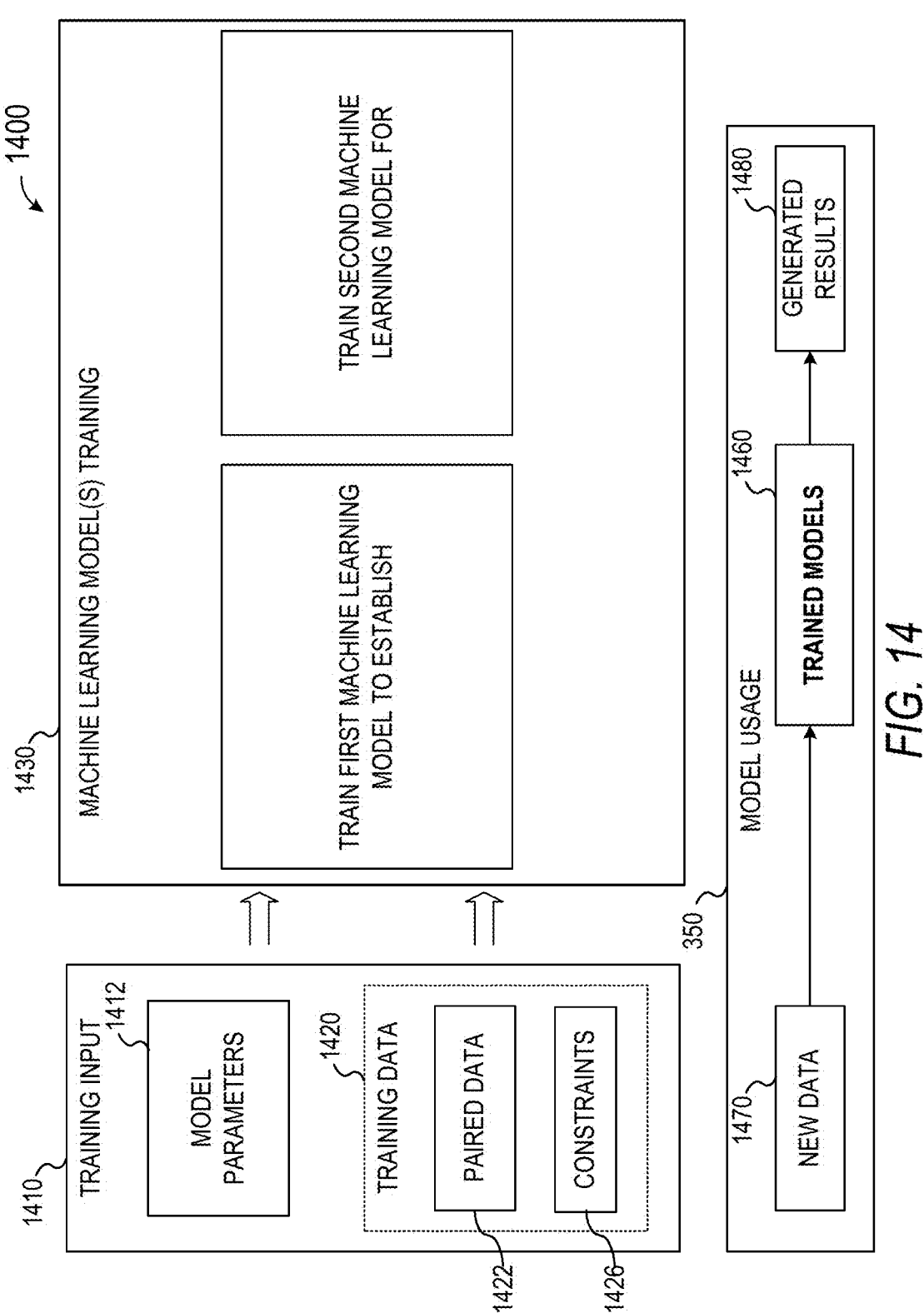
FIG. 14 is a block diagram of an example patient management platform that may be deployed within the enhanced teleservice process of FIG. 1A-1B, according to some examples.
Figure 15:
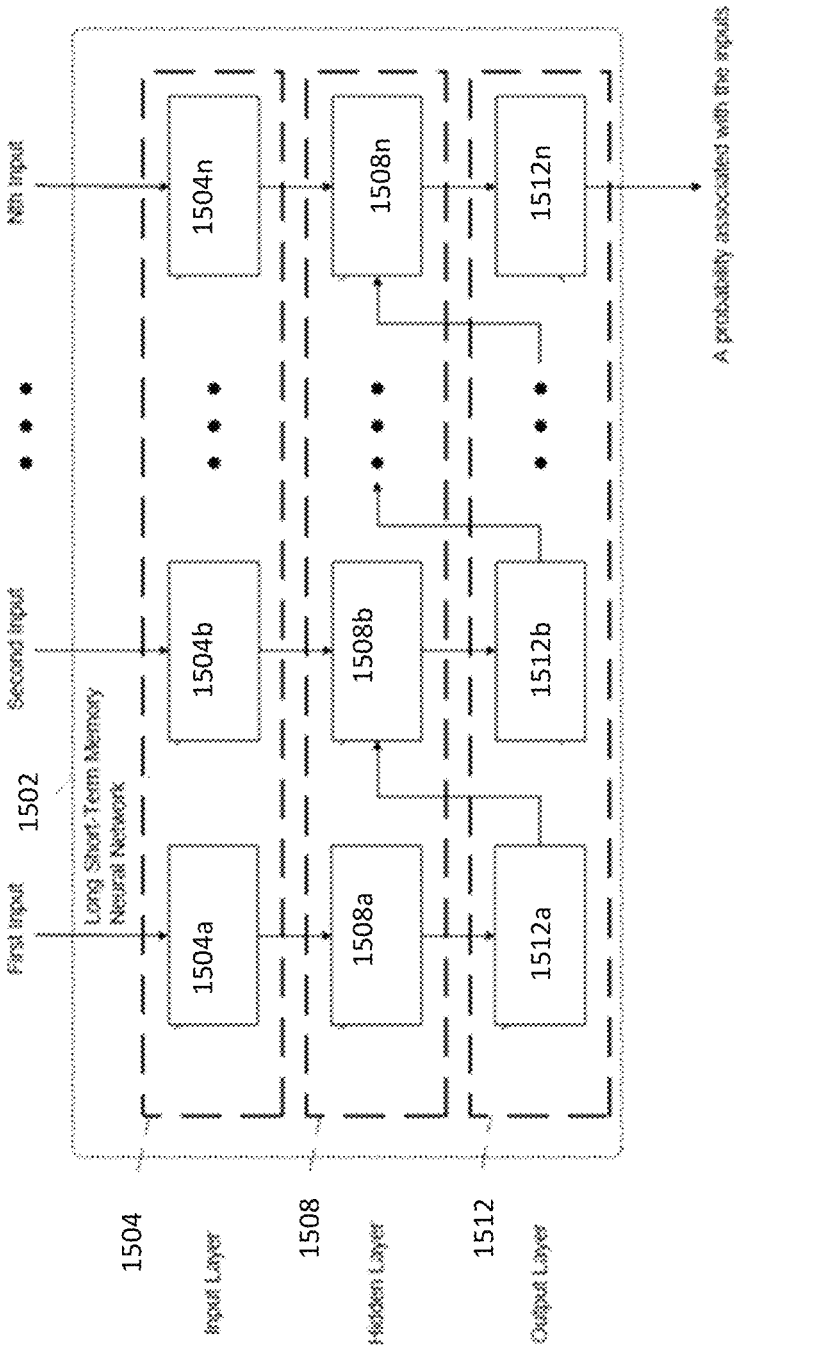
FIG. 15 is a functional block diagram of an example neural network that can be used for the inference engine or other functions (e.g., engines) as described herein to produce a predictive model.

Notably, the AI model 160 can continue to generate an updated output 166 based on data (e.g., UCs not illustrated) of the user 152 (e.g., using the systems described in FIGS. 14 and 15). For example, the AI model 160 can receive audio and video of the user 152 from the computing device 154, and generate the updated output 166. The updated output 166 can adjust an emotional presentation and dialogue of the humanlike digital actor 164 accordingly. In this example, the updated output 166 includes emotionally adjusted dialogue.

It is worth noting that the AI model 160 can be a generative model, neural network, deep neural network, etc. Furthermore, various mediums (as noted above) can connect the server 158 and the computing device 154. Furthermore, it is worth noting that the AI model 160 can operate with a plurality of different inputs. For example, the user 152 can ask the AI model 160 a question, and the AI model 160 can answer an answer that is adjusted based on the emotions of the user 152. In some examples, the AI model 160 can simulate a teacher (e.g., teach on a particular topic) and adjust the telecommunication session in real-time based on the emotions of the user 152. Furthermore, in some examples various buttons and messages (e.g., clarity, calming, etc.) can also be displayed on the computing device 154, and as described above with respect to enhanced teleservice process 100 (FIGS. 1A-1B).

Furthermore, in some examples the humanlike digital actor 164 can be replaced with a chatbot, that adjusts a presentation (e.g., color, background, etc.) and dialogue based on the emotional state of the user 152. For example, if the user 152 is anxious and/or scared, the presentation of the chatbot can be adjusted to calming colors.

Moreover, in some examples the AI-based teleservice process 150 can operate in conjunction with enhanced teleservice process 100. For example, if the AI model 160 determines that a particular emotional state of the user 152 is detected, the AI model 160 can initiate enhanced teleservice process 100 to connect the user 152 with a human service provider. The human service provider can be notified of the particular emotional state of the user 152. In some cases, the enhanced teleservice process 100 can execute and then initiate AI-based teleservice process 150 for clarification and if a particular emotion is detected (e.g., confusion).

For example the AI model 160 can provide clarifying information, etc. to the user 152. In some examples, a human service provider (not illustrated) has the ability to see a transcript of the guidance being provided to the user 152 by the AI model 160. The human service provider can accept/ confirm that the AI model 160 is accurately portraying a message prior to the message being provided. If the human service provider does not approve/confirm the message, the message will not be provided to the user 152.

The network(s) connecting the computing device 144 and the server 158 can include, or operate in conjunction with, an ad hoc network, an intranet, an extranet, a virtual private network (VPN), a local area network (LAN), a wireless network, a low energy Bluetooth (BLE) connection, a WiFi direct connection, a wireless LAN (WLAN), a wide area network (WAN), a wireless WAN (WWAN), a metropolitan area network (MAN), the Internet, a portion of the Internet, a portion of the Public Switched Telephone Network (PSTN), a plain old telephone service (POTS) network, a cellular telephone network, a wireless network, a Wi-Fi® network, another type of network, or a combination of two or more such networks. For example, a network or a portion of a network can include a wireless or cellular network and the coupling can be a Code Division Multiple Access (CDMA) connection, a Global System for Mobile communications (GSM) connection, or other type of cellular or wireless coupling. In this example, the coupling can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, fifth generation wireless (5G) networks, Universal Mobile Telecommunications System (UMTS), High Speed Packet Access (HSPA), Worldwide Interoperability for Microwave Access (WiMAX), Long Term Evolution (LTE) standard, others defined by various standard setting organizations, other long range protocols, or other data transfer technology.

Aspects of the AI-based teleservice process 150 can be implemented be implemented in logic instructions (e.g., software), configurable logic, fixed-functionality hardware logic, computer readable instructions stored on at least one non-transitory computer readable storage medium that are executable to implement the AI-based teleservice process 150, circuitry, etc., or any combination thereof. The AI-based teleservice process 150 can be a computing architecture, in which any of the components are executed in logic instructions (e.g., software), configurable logic, fixed-functionality hardware logic, computer readable instructions stored on at least one non-transitory computer readable storage medium that are executable to implement the on AI-based teleservice process 150, circuitry, etc., or any combination thereof.

FIG. 3 illustrates a method 200 of implementing an enhanced teleservice session. The method 200 can generally be implemented in conjunction with any of the embodiments described herein, for example the enhanced teleservice process 100 (FIGS. 1A-1B) and/or AI-based teleservice process 150 (FIG. 2). In an embodiment, the method 200 is implemented in logic instructions (e.g., software), configurable logic, fixed-functionality hardware logic, computer readable instructions stored on at least one non-transitory computer readable storage medium that are executable to implement method 200, circuitry, etc., or any combination thereof.

Illustrated processing block 202 establishes a telecommunication session with a first computing device associated with a first user. Illustrated processing block 204 provides first content to a first computing device to be presented on the first computing device as part of a telecommunication session associated with a first user. Illustrated processing block 206 receives telecommunication data from the first computing device as part of the telecommunication session. Illustrated processing block 208 identifies a user characteristic of the first user based on the telecommunication data, where the user characteristic is associated with the first content presented on the first computing device, where the user characteristic is one or more of a physical characteristic of the user or an audio characteristic of the user. Illustrated processing block 210 measures an emotional response of the user based on the user characteristic. Illustrated processing block 212 automatically adjusts a parameter of the telecommunication session based on the emotional response.

In some examples, the method 200 identifies a category of the first content, determines a level of understanding of the category by the first user, determines one or more of second content to be presented to the first user based on the level of understanding and the user characteristic, or third content to be presented to a second user associated with the telecommunication session based on the level of understanding and the user characteristic, and provides one or more of the second content to the first computing device, or the third content to a second computing device associated with the second user. In some examples, the method 200 adjusts the parameter of the telecommunication session by one or more of providing a first overlay on a first graphical user interface of the first computing device that corresponds to the second content, or providing a second overlay on a second graphical user interface of the second computing device that corresponds to the third content.

In some examples, the method 200 generates the first content with an artificial intelligence model, generates, with the artificial intelligence model, an output based on the emotional response, and causes the output to be presented on the first computing device during the telecommunication session. In some examples, the output corresponds to one or more of a digital human presented on the first computing device, or a chatbot presented on the first computing device.

In some examples, the method 200 determines a time stamp for one or more of a moment of confusion of the first user or a moment of anxiety of the first user based on the user characteristic, where the one or more of the moment of confusion or the moment of anxiety is the emotional response, identifies a portion of the first content based on the time stamp, and identifies mitigation information based on the portion to mitigate the emotional response. To adjust the telecommunication session, the method 200 provides the mitigation information to the first computing device as part of the telecommunication session. In such examples, the method 200 identifies a level of understanding of the first content by the first user, accesses a synonym map that associates equivalent terms with each other, identifies one or more synonyms for the portion based on the synonym map and the level of understanding, and generates the mitigation information to include the one or more synonyms, where the user characteristic is one or more of a heart rate of the user, pupil dilation of the user, breathing rate of the user, temperature of the user, blood pressure of the user or vocal quality of the user of the user.

Figure 4:
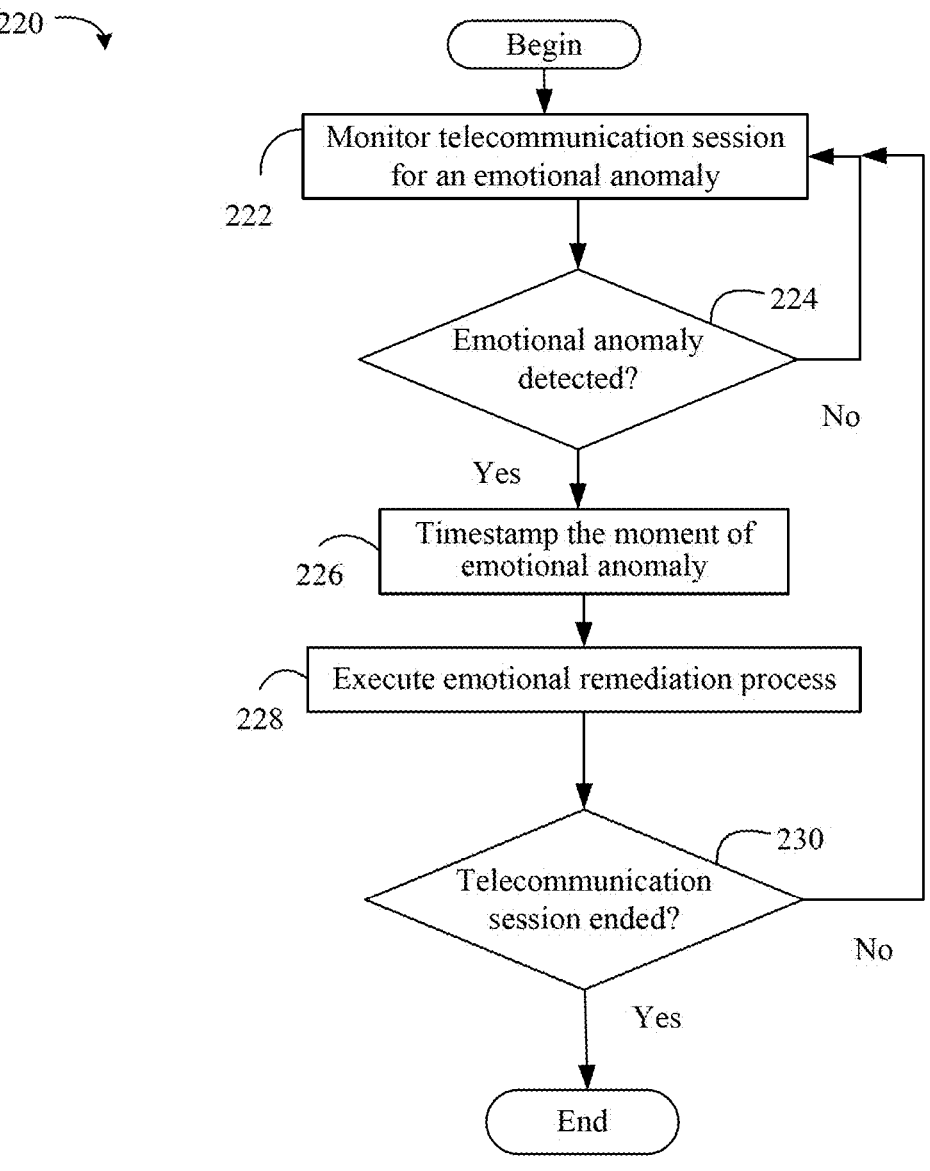
FIG. 4 is a flowchart of an example of an emotional remediation method according to an embodiment.

FIG. 4 illustrates an emotional remediation method 220 of identifying when an emotional anomaly occurs, and executing a remediation process. The method 220 can generally be implemented in conjunction with any of the embodiments described herein, for example the enhanced teleservice process 100 (FIGS. 1A-1B), AI-based teleservice process 150 (FIG. 2) and/or method 200 (FIG. 3). In an embodiment, the method 220 is implemented in logic instructions (e.g., software), configurable logic, fixed-functionality hardware logic, computer readable instructions stored on at least one non-transitory computer readable storage medium that are executable to implement method 220, circuitry, etc., or any combination thereof.

Illustrated processing block 222 monitors a telecommunication session for an emotional anomaly. An emotional anomaly can be an unexpected emotion, an emotion that should not be caused by the substance of the telecommunication session and/or a predetermined emotion that is categorized as anomalous. Illustrated processing block 224 determines if an emotional anomaly is detected. If not, processing block 222 executes.

Otherwise, if an emotional anomaly is detected by processing block 224, illustrated processing block 226 timestamps the moment of the emotional anomaly. Various operations can determine the moment of the emotional anomaly. For example, eye-tracking features, such as duration spent fixated on an area of interest can indicate confusion. Eye fixation levels (e.g., the quantity, duration, accuracy, and position of eye fixations on a computer screen), when combined with user specific features (e.g., demographic information such as age and gender, and/or user specific information such as height, weight, etc.), has also shown to be effective at detecting emotion. For example, a camera of the user can image the user. The eye fixation levels can be determined based on the images of the user. For example, a machine learning model can correlate the fixations as well as eye saccadic distances to utterance-based coding (e.g., concurrent think aloud) to gain controls on confusion or clarity. An example may include providing users with a plausible and familiar piece of content, while editing one or two glaring details to stimulate confusion to the user. This, when done in large enough samples, will be used along with the capture of the user profile and utterance based admissions from the user set that they are indeed confused to build a more confident model for detection of the emotion of confusion. Similar simulations can exhibit other emotions for which our system can support the recognition of by editing content in various ways. The data can be smoothed using the SMOTE (Synthetic Minority Over Sampling Technique) algorithm in order to overcome imbalances of confusion versus non-confusion data in the model. Examples can include a Random Forest (RF) classifier because these RF classifiers provide interpretability. The RF classifier found success rate when executing the RF classifier against the remaining set of non-trained data and sample executions.

This aforementioned process can be applied not just to static text but also to a tele-conference session with a plain background. Therefore, building a sufficient RF model based on the correlation of eye fixations, saccadic distances as well as utterance-based coding (e.g., concurrent think aloud) to gain controls on confusion or clarity is executed. When supplemented with user specific features of age and gender, examples expect a similarly sufficient predictive model.

A particular example is provided below, and assumes that the particular telecommunication session (e.g., teleconference session) is related to medicine. Application of this aforementioned technique can be applied to the telemedical conference session in order to build a model (e.g., RF model or RF classifier) which is specific to working with clinicians over a teleconference session. The first step can include identifying the ten most common conversational scenarios between a clinician (e.g., service provider) and patient (e.g., user) including events such as specific diagnosis explanation, follow-up directions, dispensing instructions, etc. Secondly, examples can adapt the utterance based coding and static user interfaces (UIs) to the conversational environment. A model can be built based on the admission of confusion by participants (e.g., labeled data indicating that a participant in an image is confused) considering age, location and other supplemental aspects which have proven successful in the above method 220. The classifier can meet or surpass those developed using static content.

Some examples can also employ a RF classifier and features based on summative statistics of eye-tracking (ET) data (user gaze, pupil size, and head distance from the screen) computed as the interaction unfolds to determine emotions, and in particular moments of confusion. For example, deep learning can be successfully applied to a variety of domains, and advanced methods can be employed. Some architectures can also use a Recurrent Neural Network (RNN) and a Convolutional Neural Network (CNN) to learn from sequential and visuospatial information in eye tracking and executed valuations of these facial sub-models in parallel to take advantage of the temporal and visuospatial aspects the data. Convenience based neural network API's provide proven enhancements, which can generate labels such as "confused" via the examination of still images. Some examples can take video instead of still images to train algorithms, as well as more contextual/geospatial data (e.g., voice, gait, tiny changes in the face that take place beyond human perception as well as the more generic approach of region-specific classification/evaluation).

Detecting moment-of-anxiety can be determined with a vigilance-avoidance hypothesis. The vigilance-avoidance hypothesis of selective attention assumes that a socially anxious persons initially directs the attention of the socially anxious person toward fear-related stimuli and subsequently avoids these social stimuli to reduce emotional distress. For example, highly socially anxious (HSA) individuals exhibit this more so than low socially anxious individuals. The aforementioned can be used to analyze teleservice sessions such that quantifying the duration of approach for which the user is looking at the service provider, hypervigilance (time to first fixation), and attentional avoidance (count of fixations) away from the service provider during the teleservice session can represent anxiety. The above is known to be exhibited more prominently in highly socially anxious individuals, as opposed to lower socially anxious subjects and therefore other techniques can be leveraged in conjunction with the above.

A measured approach can include utilization of a framework for the detection and analysis of stress/anxiety emotional states through video-recorded facial cues. Therefore, some examples focus mainly on non-voluntary and semi-voluntary facial cues in order to estimate the emotion representation more objectively. Features under investigation include eye-related events, mouth activity, head motion parameters and heart rate estimated through camera-based photoplethysmography. The results indicated classifiers which leverage facial cues, derived from eye activity, mouth activity, head movements and camera-based heart activity achieve good accuracy and are suitable as discriminative indicators of stress and anxiety, achieving successful classification accuracy. Indeed, some examples can obtain the above indicators with infrared (IR) and eye tracking web cameras for portability and incorporation in common devices such as tablets, laptops and external web cams. It should be noted that other bio-signals like Galvanic Skin Response (GSR), Pupil Diameter (PD) and Skin Temperature (ST) are used also for discriminating stress situations. Other emotions can be readily identified based on the above identifiers as well. It should further be noted that other types of devices can be incorporated into the above, such as smart watches.

Illustrated processing block 228 executes an emotional remediation process. For example, if the emotional anomaly is confusion, examples can generate an explanation based on the timestamp. For example, the timestamp can correspond to a particular phrase or conversation that occurred. Examples can analyze the phrase or conversation, and generate a more easily understandable phrasing for the particular phrase or conversation. The more easily understandable phrasing can be presented to the user (e.g., overlaid on a GUI of a user device of the user, a digital human speaks the understandable phrasing, etc.). If the emotion is anxiety, a calming phrase or recalling the user's attention to the most important calming and reassuring details can be provided to the user. A notification can also be provided to the service provider indicating that clarification and/or calming has been requested. Illustrated processing block 230 determines if the telecommunication session has ended. If not, processing block 222 ends. Otherwise, the method 220 ends.

Figure 5:
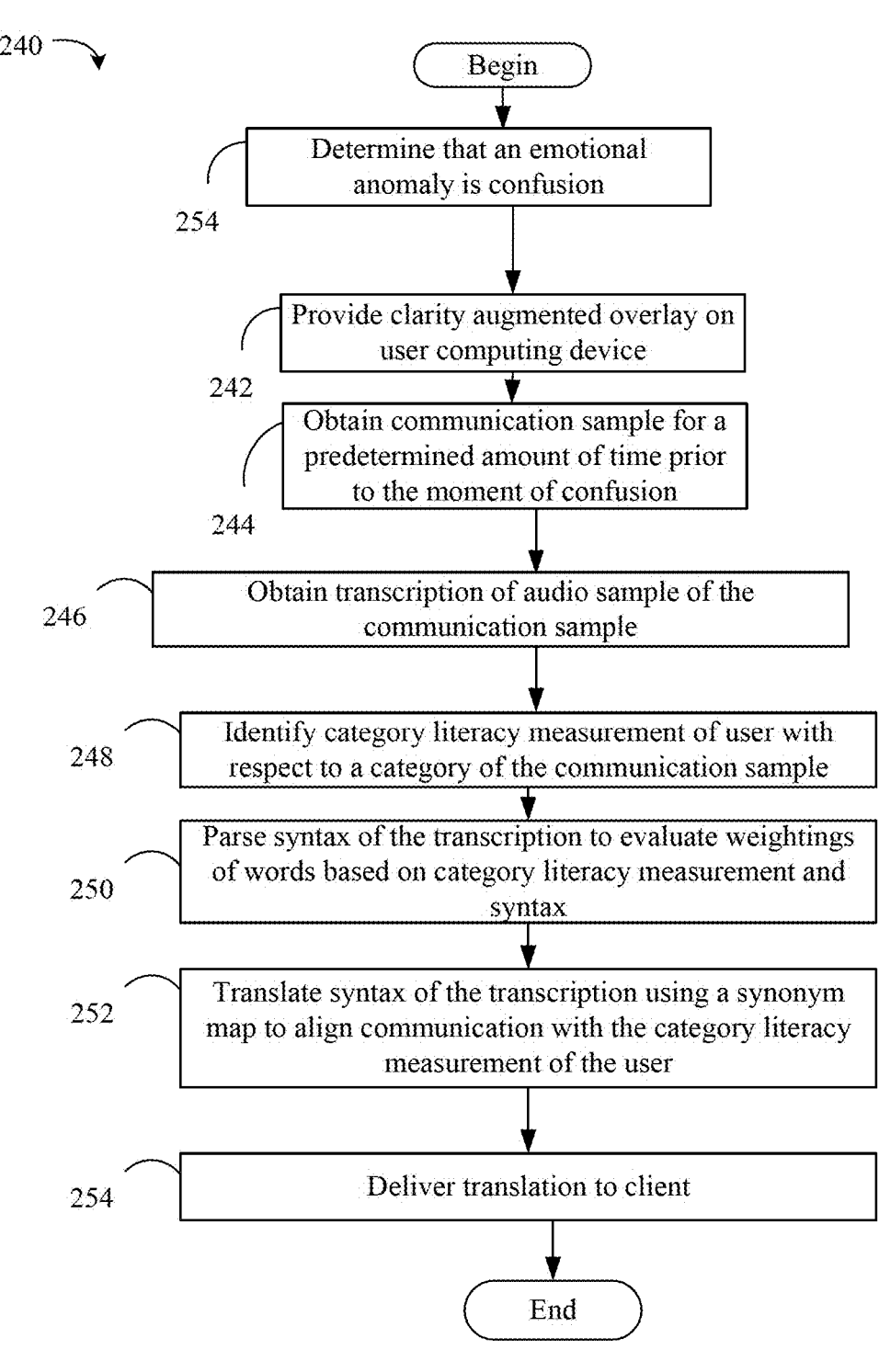
FIG. 5 is a flowchart of an example of a confusion remediation method according to an embodiment.

FIG. 5 illustrates a confusion remediation method 240. The method 240 can generally be implemented in conjunction with any of the embodiments described herein, for example the enhanced teleservice process 100 (FIGS. 1A-1B), AI-based teleservice process 150 (FIG. 2), method 200 (FIG. 3) and/or method 220 (FIG. 4). In an embodiment, the method 240 is implemented in logic instructions (e.g., software), configurable logic, fixed-functionality hardware logic, computer readable instructions stored on at least one non-transitory computer readable storage medium that are executable to implement method 240, circuitry, etc., or any combination thereof.

Illustrated processing block 254 determines than an emotional anomaly is confusion. Illustrated processing block 242 provides a clarity augmented overlay on a user computing device. Illustrated processing block 244 obtains a communication sample for a predetermined amount of time prior to the moment of confusion. Illustrated processing block 246 obtains a transcription of audio sample of the communication sample (e.g., using speech to text service).

Illustrated processing block 248 identifies a category literacy measurement of a user with respect to a category of the communication sample. For example, different users can have different levels of understanding with respect to different fields (categories). Thus, examples identify a level of literacy of the user to determine how to rephrase terminologies in a way that the user will understand. Examples can determine the category literacy measurement of the user based on a background of the user, user answers to survey questions, historical information, social network information, etc.

Illustrated processing block 250 parses syntax of the transcription to evaluate a weightings of words. That is, an existing concern is identifying the words, terms and/or phrases that cause confusion. In order to do so, weightings for different words are determined. For example, category literacy measurements can be determined ahead of time. The category literacy measurements can quantify a measurement of a technical nature of a terminology and/or phrase. Higher category literacy measurements indicate that a term is technical in nature (e.g., only understood by experts in the category), while lower category literacy measurements can indicate that the term is well understood by most people, including those who are not considered experts in the category.

Illustrated processing block 252 translates a syntax of the transcription using a synonym map to align communication with the category literacy measurement of the user. Examples, translate the syntax of the transcription using the synonym map to align communication of the user with the category literacy measurements (e.g., synonyms for existing words in the transcription) based on the category literacy measurement of the user.

A synonym map allows for associating equivalent terms with each other. For example, assuming "cat", "kitty", and "kitten" are synonyms, a term "kitty" will match on the term "cat". Mapping rules can adhere to the open-source synonym filter specifications (e.g., Apache® Solr). A synonym map can include a name, and rules which function as synonym map entries. This can be a structure formatted with the keys of 'name' and 'synonyms' along with their respective values. The following pseudocode can illustrate the synonym map:

---

Pseudocode I

```
{
// "Synonym map name"
"name": "animal_syn_map",
// "Synonym rules separated by the comma delimiter"
    "synonyms": "
    dog, canine, puppy\n
    cat, kitten, kitty\n
    "
    }
```

---

An extension would add a weighted field which would coincide with the category literacy scale rates (category literacy measurements). A score separating delimiter '-' would be attached to each word along with a numeric integer. Proposed synonyms will only be that which map to the users category literacy measurement. Exemplary pseudocode is provided below:

---

Pseudocode II

```
{
// "Synonym map name"
"name": "medical_syn_map",
// "Synonym rules separated by the comma delimiter"
    "synonyms": "
    acute myocardial infarction-400, cardiopulmonary arrest-300, heart
    attack-200, \n
    dyspnea-400, breathlessness-300, shortness of breath-200, \n
```

---

The synonym map can include a listing of words, synonyms of the words and category literacy measurements of the synonyms. If the user has a high level of understanding of the category (the category literacy measurement of the user is higher), more technical synonyms can be selected more heavily (e.g., more technical synonyms with higher category literacy measurements are likely to be selected to rephrase confusing portions of the transcription as opposed to less technical synonyms with lower category literacy measurements). If the user has a low level of understanding of the category (the category literacy measurement of the user is lower), less technical synonyms can be adopted (e.g., the less technical synonyms are more likely to be selected to rephrase confusing portions of the transcription as opposed to the more technical synonyms).

In some examples, processing block 252 replaces terms in the transcription that have category literacy measurements that do not align (e.g., come within a predetermined range) of the category literacy measurement of the user, with terms that do align with (have category literacy measurements) the category literacy measurement of the user. Illustrated processing block 254 delivers the translation to the client (e.g., a user and/or service provider).

Figure 6:
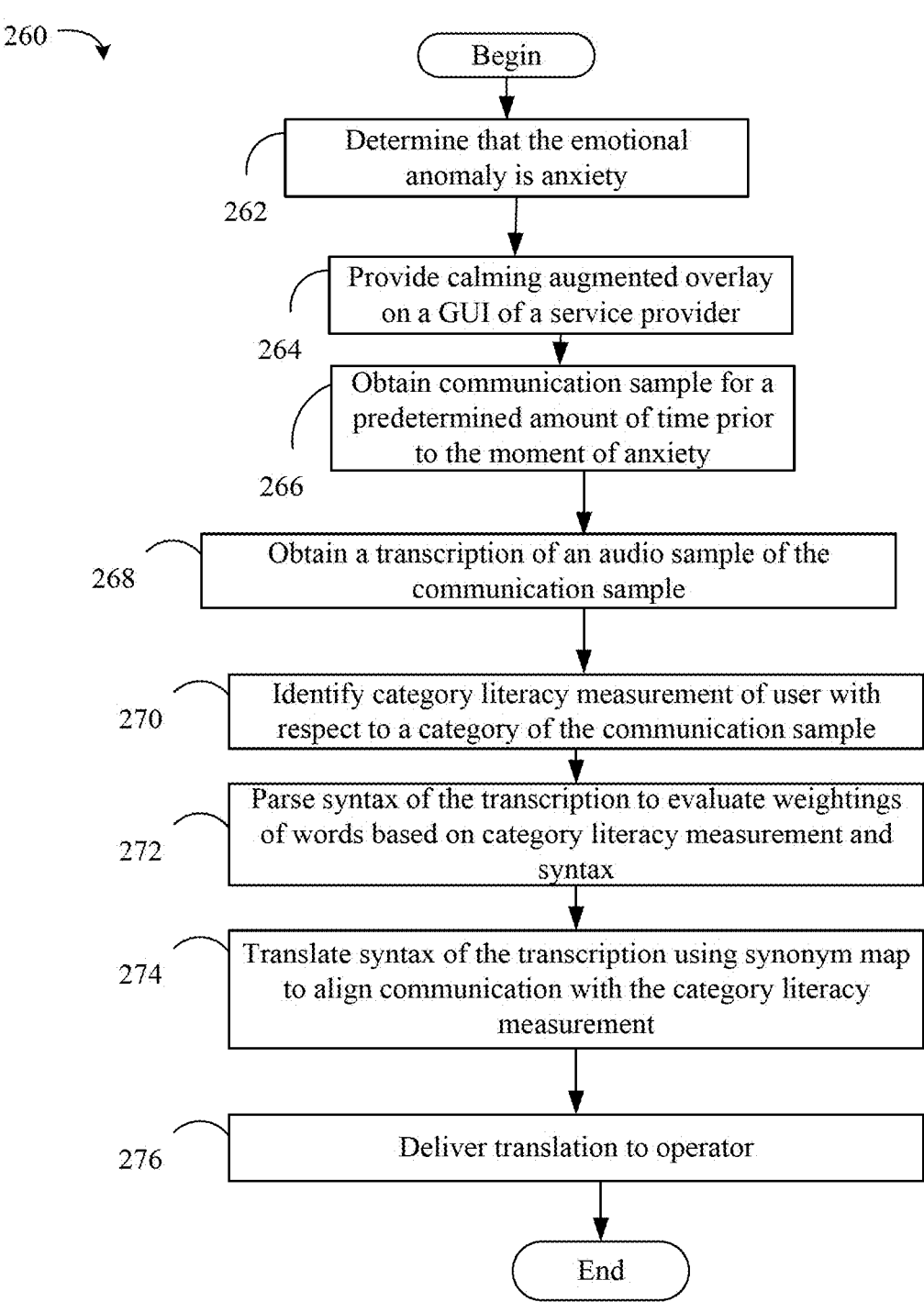
FIG. 6 is a flowchart of an example of anxiety remediation method according to an embodiment.

FIG. 6 illustrates an anxiety remediation method 260. The method 260 can generally be implemented in conjunction with any of the embodiments described herein, for example the enhanced teleservice process 100 (FIGS. 1A-1B), AI-based teleservice process 150 (FIG. 2), method 200 (FIG. 3 method 220 (FIG. 4) and/or method 240 (FIG. 5). In an embodiment, the method 260 is implemented in logic instructions (e.g., software), configurable logic, fixed-functionality hardware logic, computer readable instructions stored on at least one non-transitory computer readable storage medium that are executable to implement method 260, circuitry, etc., or any combination thereof.

Illustrated processing block 262 determines that the emotional anomaly is anxiety. Illustrated processing block 264 provides a calming augmented overlay on a GUI of the service provider. Illustrated processing block 266 obtains a communication sample for a predetermined amount of time prior to the moment of anxiety. Illustrated processing block 268 obtains a transcription of an audio sample of the communication sample (e.g., using speech to text service). Illustrated processing block 270 identifies a category literacy measurement of a user similarly to as described in illustrated process block 248 (FIG. 5). Illustrated processing block 272 parses syntax of the transcription to evaluate weightings of words based on a category literacy measurement and syntax similarly to as described in illustrated process block 250 (FIG. 5). Illustrated processing block 274 translates the syntax of the transcription using a synonym map to align communication with the category literacy measurement similarly to as described in illustrated process block 252 (FIG. 5). Illustrated processing block 276 delivers a translation to the client (e.g., a service provider and/or user).

Figure 7:
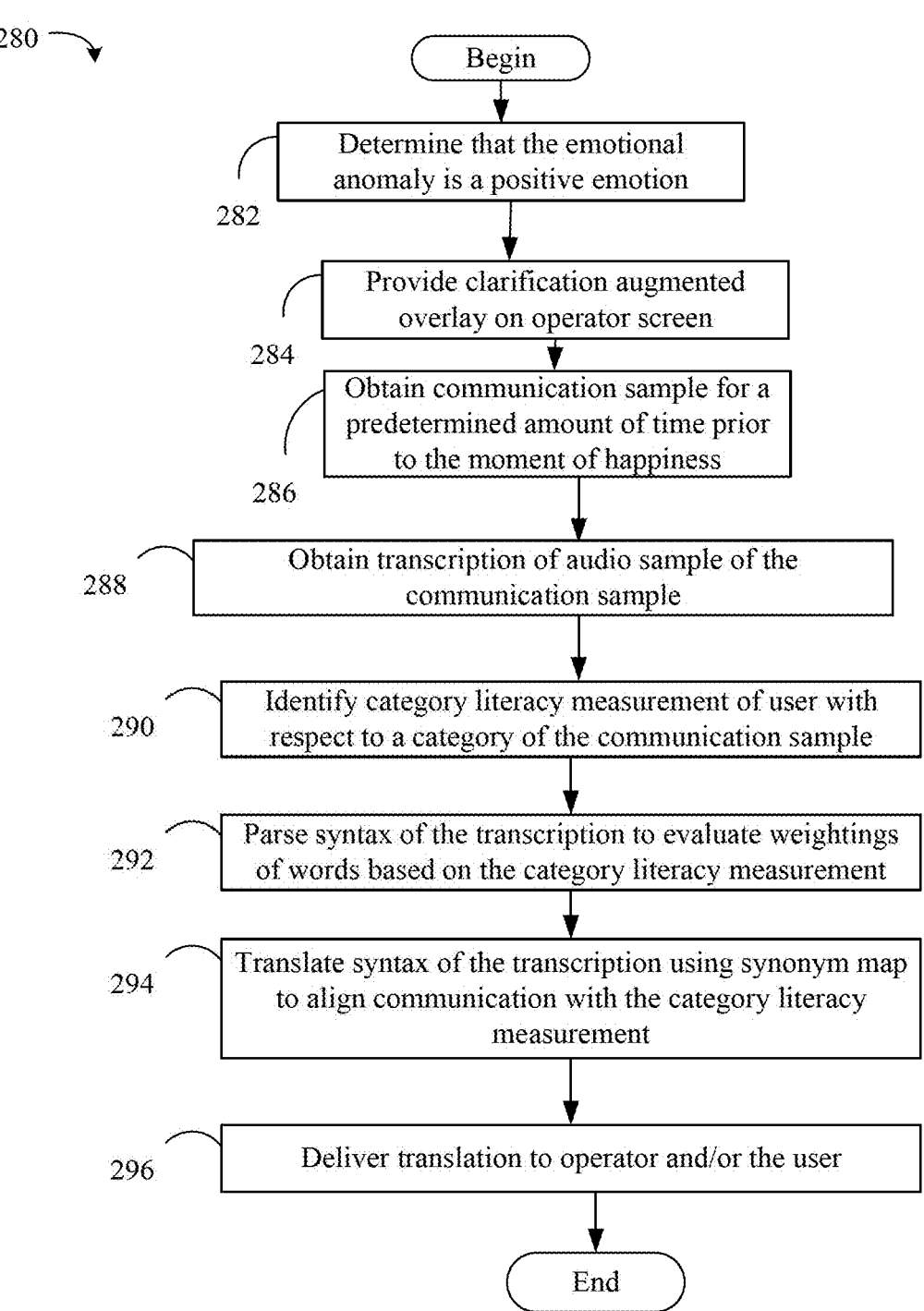
FIG. 7 is a flowchart of an example of positive remediation method according to an embodiment.

FIG. 7 illustrates a positive remediation method 280. The method 280 can generally be implemented in conjunction with any of the embodiments described herein, for example the enhanced teleservice process 100 (FIGS. 1A-1B), AI-based teleservice process 150 (FIG. 2), method 200 (FIG. 3), method 220 (FIG. 4), method 240 (FIG. 5) and/or method 260 (FIG. 6). In an embodiment, the method 280 is implemented in logic instructions (e.g., software), configurable logic, fixed-functionality hardware logic, computer readable instructions stored on at least one non-transitory computer readable storage medium that are executable to implement method 280, circuitry, etc., or any combination thereof.

Illustrated processing block 282 determines that the emotional anomaly is a positive emotion. In detail, while the emotional anomaly can be a negative emotion, some examples further extend to the notion that happiness can also be an emotional anomaly in some examples. Suppose for example that the service provider is a health care provider, and the user is a patient. If the health care provider delivers negative health information of the patient, it is reasonable to believe that the patient will not exhibit a positive emotion (e.g., happiness) and can display a negative emotion (e.g., sadness). In such an example, the patient can misunderstand the statements of the health care provider, causing the patient to have an unnatural reaction to the health information. In such a case, the health care provider can be prompted to clarify the health information, and/or clarification of the health information can be provided to the patient.

Illustrated processing block 284 provides a clarity augmented overlay on an operator screen (e.g., user and/or service provider), similar to processing block 242 (FIG. 5). Illustrated processing block 286 obtains a communication sample for a predetermined amount of time prior to the moment of anxiety, similar to processing block 244 (FIG. 5). Illustrated processing block 288 obtains a transcription of an audio sample of the communication sample (e.g., using speech to text service). Illustrated processing block 290 identifies a category literacy measurement of a user with respect to a category of the communication sample (e.g., a topic of the discussion between the user and service provider) similarly to as described in illustrated process block 248 (FIG. 5). Illustrated processing block 292 parses syntax of the transcription to evaluate weightings of words based on a category literacy measurement and syntax similarly to as described in illustrated process block 250 (FIG. 5). Illustrated processing block 294 translates the syntax of the transcription using a synonym map to align communication with the category literacy measurement similarly to as described in illustrated process block 252 (FIG. 5). Illustrated processing block 296 delivers a translation to the client (e.g., a service provider and/or user).

FIG. 8 illustrates a literacy measurement identification method 300. The method 300 can generally be implemented in conjunction with any of the embodiments described herein, for example the enhanced teleservice process 100 (FIGS. 1A-1B), AI-based teleservice process 150 (FIG. 2), method 200 (FIG. 3), method 220 (FIG. 4), method 240 (FIG. 5), method 260 (FIG. 6) and/or method 280 (FIG. 7). In an embodiment, the method 300 is implemented in logic instructions (e.g., software), configurable logic, fixed-functionality hardware logic, computer readable instructions stored on at least one non-transitory computer readable storage medium that are executable to implement method 300, circuitry, etc., or any combination thereof.

Illustrated processing block 302 identifies a category of first content. The first content can be information exchanged between a user and a service provider during a teleservice session. Illustrated processing block 304 determines a user's category literacy measurement of the category by one or more of accessing a historical record, accessing a social network, survey score, or user preferences of the user. For example, the user can answer questions about a level of understanding of the category prior to the teleservice session occurring. Illustrated processing block 306 outputs the user's category literacy measurement. The user's category literacy measurement can be the "category literacy measurement of the user" as described in processing block 248 (FIG. 5), processing block 270 (FIG. 6) and processing block 290 (FIG. 7).

FIG. 9 illustrates an AI adjustment method 320. The method 320 can generally be implemented in conjunction with any of the embodiments described herein, for example the enhanced teleservice process 100 (FIGS. 1A-1B), AI-based teleservice process 150 (FIG. 2), method 200 (FIG. 3), method 220 (FIG. 4), method 240 (FIG. 5), method 260 (FIG. 6), method 280 (FIG. 7) and/or method 300 (FIG. 8). In an embodiment, the method 320 is implemented in logic instructions (e.g., software), configurable logic, fixed-functionality hardware logic, computer readable instructions stored on at least one non-transitory computer readable storage medium that are executable to implement method 320, circuitry, etc., or any combination thereof.

Illustrated processing block 322 generates an AI interface (e.g., digital human) for a user. Illustrated processing block 324 detects an emotional anomaly. Illustrated processing block 326 adjusts an output of the AI model based on the emotional anomaly. Illustrated processing block 328 provides the AI output to the user.

Figure 10:
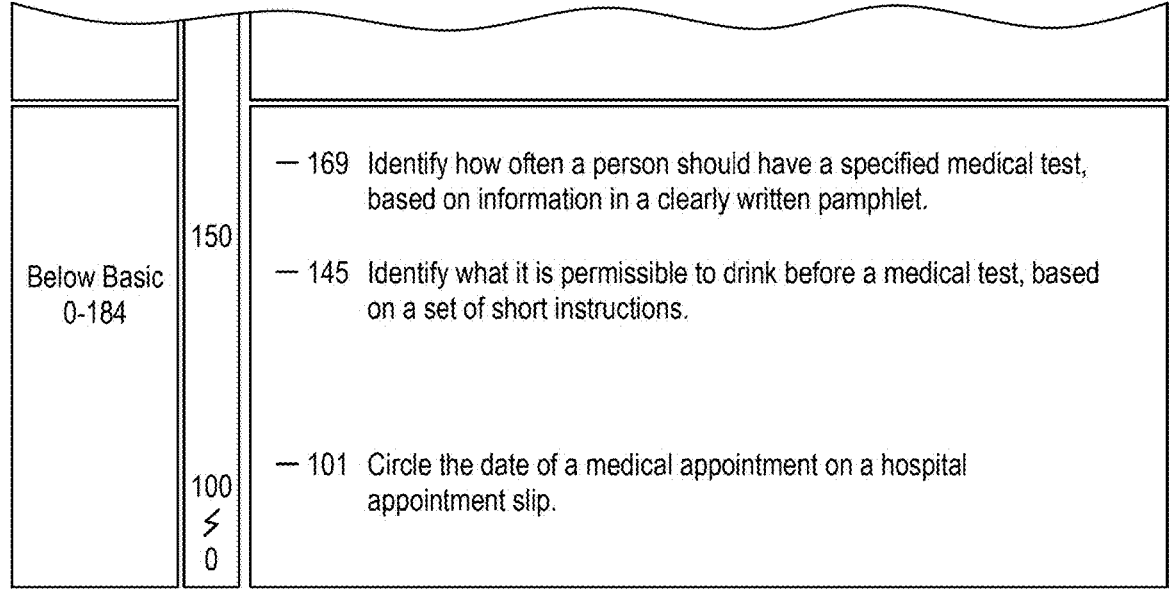
FIG. 10 is a diagram of an example of a health literacy measurement scale according to an embodiment.

FIG. 10 illustrates a health literacy measurement scale 350, particularly with respect to health. The health literacy measurement scale 350 can generally be implemented in conjunction with any of the embodiments described herein, for example the enhanced teleservice process 100 (FIGS. 1A-1B), AI-based teleservice process 150 (FIG. 2), method 200 (FIG. 3), method 220 (FIG. 4), method 240 (FIG. 5), method 260 (FIG. 6), method 280 (FIG. 7), method 300 (FIG. 8) and/or method 320 (FIG. 9). In an embodiment, the health literacy measurement scale 350 is implemented in logic instructions (e.g., software), configurable logic, fixed-functionality hardware logic, computer readable instructions stored on at least one non-transitory computer readable storage medium that are executable to implement health literacy measurement scale 350, circuitry, etc., or any combination thereof.

The National Assessment of Adult Literacy (NAAL) provides information on the literacy/health literacy levels of the U.S. adult population. The NAAL is the only large-scale survey of health literacy. The results of the NAAL provide information on literacy and/or health literacy and the relationship between background variables and literacy/health literacy. The health literacy levels of the NAAL participants are very similar but not identical to the overall prose, document, and quantitative literacy of the overall NAAL. Participants scores are ranged between 0 and 500 and subsequently into four levels which reflect the skills and knowledge needed to function at a particular literacy level. The four literacy levels are (1) below basic (score of 0-184), (2) basic (score of 185-225), (3) intermediate (score of 226-309), and (4) proficient (score of 310-500).

In some examples, prior to initiating a teleservice session, a user will electronically execute a corresponding survey questionnaire and associated tasks, which can then be evaluated to determine a score for the user to provide an initial value for health literacy measurement of the user. The health literacy measurement can be leveraged for several purposes, including aligning syntax of the synonym mapping sentence to meet client health literacy proficiency, provided to service provider (e.g., clinician) at the start of a telehealth session such that the service provider can prepare to adjust the prose and communication tactics used when interacting with the user. The score can also be stored in a permanent record (e.g., Electronic Health Record (EHR)). The EHR is a digital patient record aggregated from multiple doctors and used to provide a more holistic, long-term view of a patient's health. The EHR includes client's demographics, test results, medical history, history of present illness (HPI), and medications. The score can be updated at the conclusion of a session by clinician to reflect dynamic learning of client.

Different synonyms can have different health literacy measurements and can be categorized into different category literacy levels. For example, more complex medical terms. For example, "acute myocardial infraction" has a category literacy level of 400, and is classified into the "proficient" category literacy level as a consequence. As such, when rephrasing is executed for a user having a category literacy level of 310 or more, the term "acute myocardial infraction" can be selected as a synonym to replace another term in a confusing portion of a conversation.

As another example, "cardiopulmonary arrest" has a category literacy level of 300, and is classified into the "intermediate" category literacy level as a consequence. As such, when rephrasing is executed for a user having a category literacy level of 226-309, the term "cardiopulmonary arrest" can be selected as a synonym to replace another term in a confusing portion of a conversation.

Further yet, "heart attack" has a category literacy level of 200, and is classified into the "basic" category literacy level as a consequence. As such, when rephrasing is executed for a user having a category literacy level of 185-225, the term "heart attack" can be selected as a synonym to replace another term in a confusing portion of a conversation.

While a health literacy measurement scale 350 is illustrated, it will be understood that other types of category literacy measurement scales can be provided. For example, a different literacy measurement scale for each various educational topic (e.g., algebra, social studies, English, etc.) can be generated, and utilized to reword portions of a conversation between a service provider and a user (e.g., algebra literacy measurement scale is used when the topic is algebra, social studies literacy measurement scale is used when the topic is social studies, English literacy measurement scale is used when the topic is English). A different literacy measurement scale can be generated for any topic.

Figure 11A:
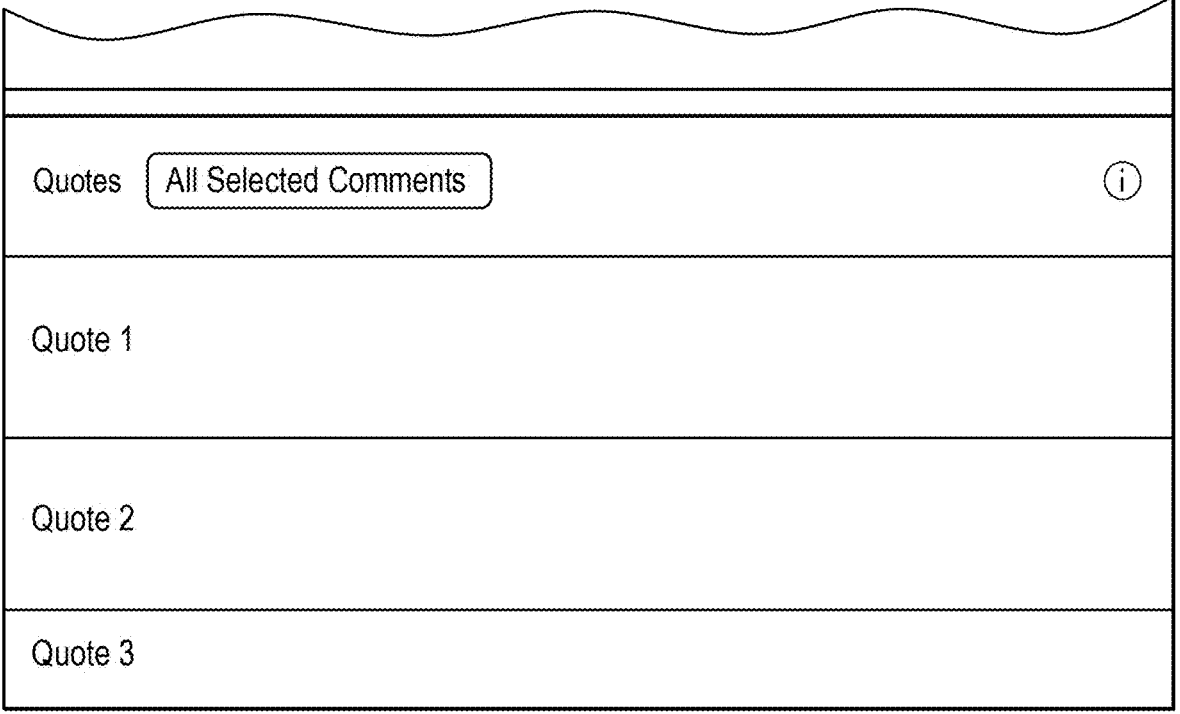
FIGS. 11A-11B are a diagram of an example of training data according to an embodiment.
Figure 11B:
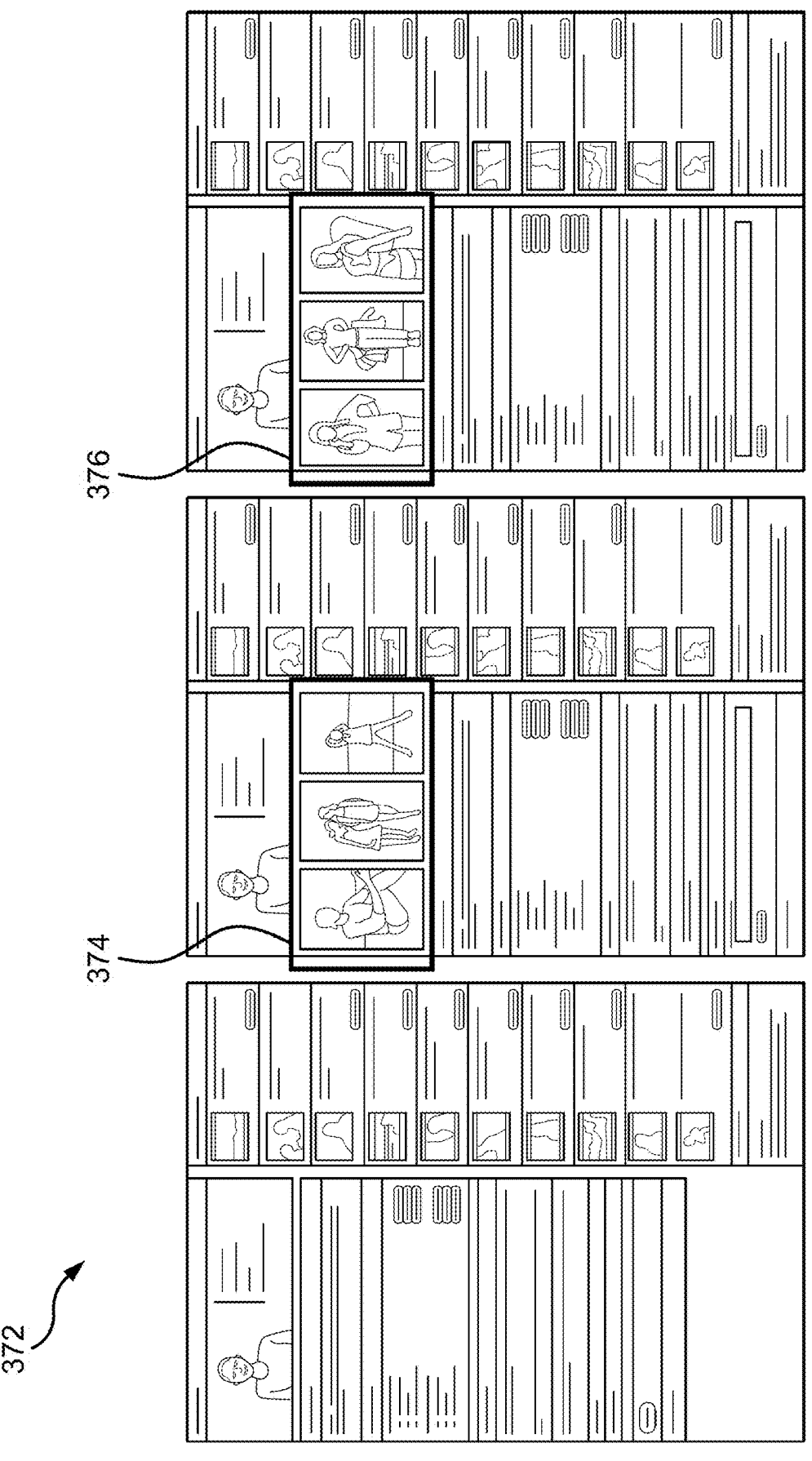

FIGS. 11A-11B illustrates training data 370, 372 to train an AI model to identify emotions. The training data 370 can generally be implemented in conjunction with any of the embodiments described herein, for example the enhanced teleservice process 100 (FIGS. 1A-1B), AI-based teleservice process 150 (FIG. 2), method 200 (FIG. 3), method 220 (FIG. 4), method 240 (FIG. 5), method 260 (FIG. 6), method 280 (FIG. 7), method 300 (FIG. 8), method 320 (FIG. 9) and/or health literacy measurement scale 350 (FIG. 10). In an embodiment, the training data 370, 372 is implemented in logic instructions (e.g., software), configurable logic, fixed-functionality hardware logic, computer readable instructions stored on at least one non-transitory computer readable storage medium that are executable to implement the training data 370, 372, circuitry, etc., or any combination thereof.

Examples can use an automatic persona generation (APG) system persona profile. APG is a methodology for creating persona automatically from online analytics data, as illustrated in training data 370, 372. As illustrated in 372, examples then create alternate renditions of the profile with differing people in the images, to simulate different emotions (e.g., confusion) as illustrated at profiles 374, 376.

Figure 12:
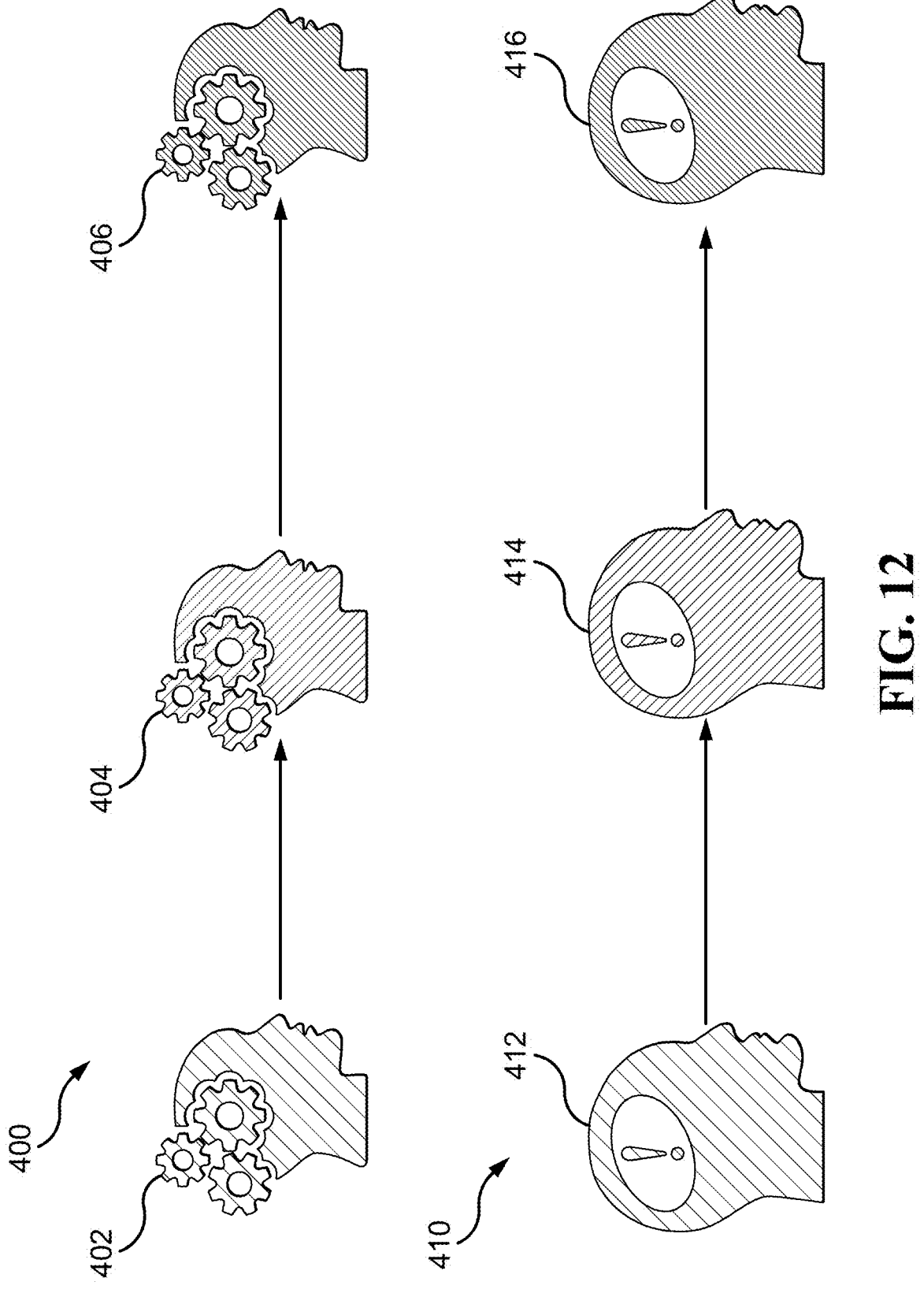
FIG. 12 is a diagram of an example of notification icons according to an embodiment.

FIG. 12 illustrates notification icons 400, 410. The notification icons 400, 410 can generally be implemented in conjunction with any of the embodiments described herein, for example the enhanced teleservice process 100 (FIGS. 1A-1B), AI-based teleservice process 150 (FIG. 2), method 200 (FIG. 3), method 220 (FIG. 4), method 240 (FIG. 5), method 260 (FIG. 6), method 280 (FIG. 7), method 300 (FIG. 8), method 320 (FIG. 9), health literacy measurement scale 350 (FIG. 10) and/or training data 370, 372 (FIGS. 11A-11B). In an embodiment, the notification icons 400, 410 is implemented in logic instructions (e.g., software), configurable logic, fixed-functionality hardware logic, computer readable instructions stored on at least one non-transitory computer readable storage medium that are executable to implement notification icons 400, 410, circuitry, etc., or any combination thereof.

Throughout the telecommunication session, a service provider can receive a real time visual icon 402, 404, 406 indicating a level of understanding a user is currently having with the conversation. This can be in the form of a stoplight structure (e.g., different colors) which indicates that the user is losing understanding and that things will need to be repeated or detailed further. For example, icon 402 indicates that the user understands the service provider, icon 404 indicates that the user is having difficulty understanding the service provider, and icon 406 indicates that the user fails to understand the service provider.

Similarly, the service provider can receive a real time visual icon 412, 414, 416 indicating the level of anxiety a user is currently having with the conversation. This can be in the form of a stoplight structure (e.g., different colors) which indicates that the patient is losing confidence and may need intervention to provide reassurance actions. For example, icon 412 indicates that the user is not anxious, icon 414 indicates that the user is becoming anxious, and icon 416 indicates that the user is anxious.

Post-conversation, both the user and the service provider would be able to view summarized contextual segments separated by different emotions (e.g., anxiety and confusion). Service providers can use the summarized contextual segments as dynamic personalized feedback for which the service providers can improve user relations going forward. Furthermore, this measurement can be used to provide a metric for which the delivery manner of a service provider can be judged. For example, a supplemental system can be built in order to align those with lower bedside manner with patients that have stronger health literacy scores such that confusion and anxiety would not be as much an issue when interpreting the language of clinicians.

Figure 13:
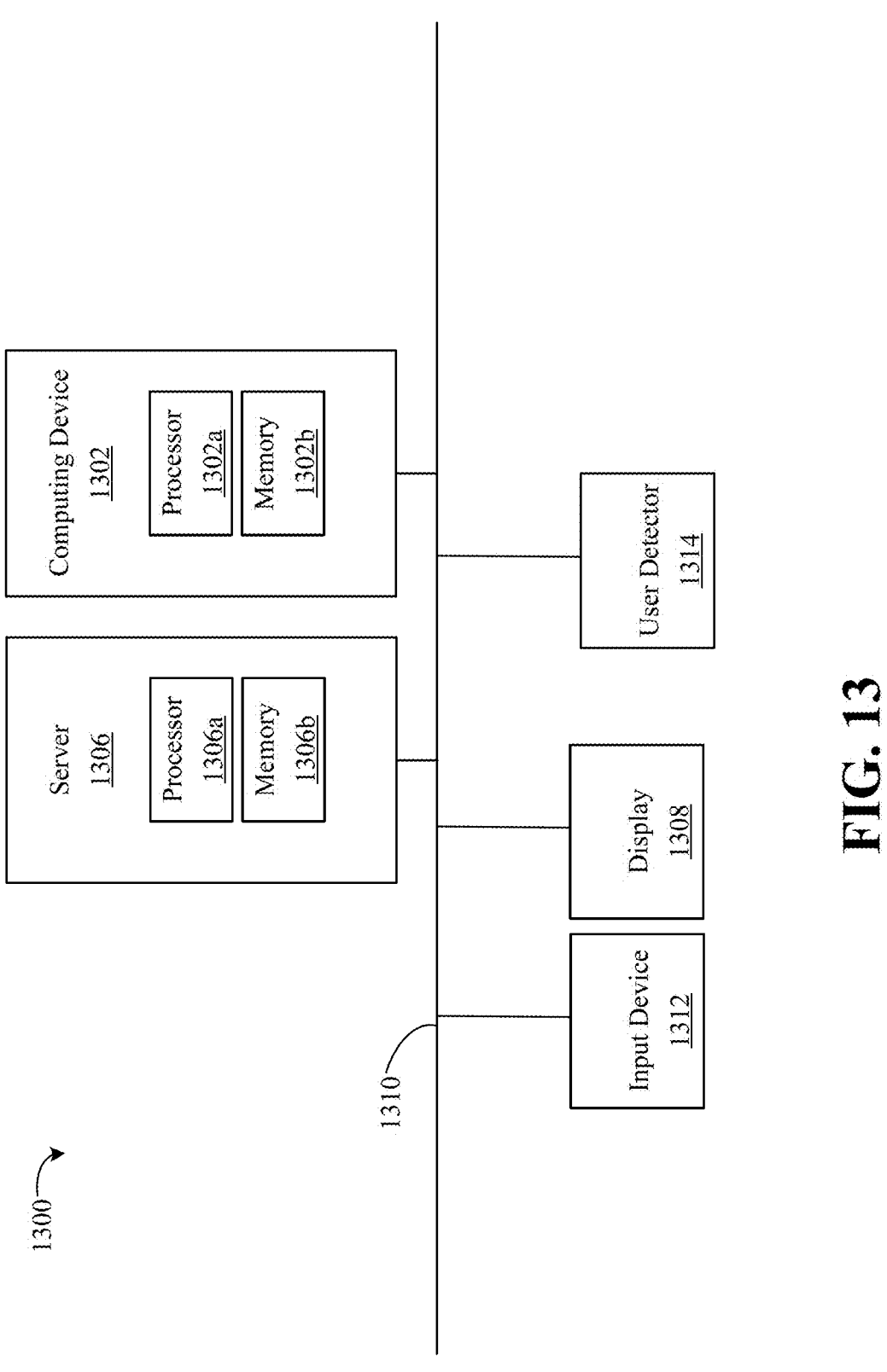
FIG. 13 is a block diagram of an example of a computing system according to an embodiment.

FIG. 13 shows a more detailed example of a computing system 1300 to execute an enhanced telecommunication process. The computing system 1300 can generally be implemented in conjunction with any of the embodiments described herein, for example the enhanced teleservice process 100 (FIGS. 1A-1B), AI-based teleservice process 150 (FIG. 2), method 200 (FIG. 3), method 220 (FIG. 4), method 240 (FIG. 5), method 260 (FIG. 6), method 280 (FIG. 7), method 300 (FIG. 8), method 320 (FIG. 9), health literacy measurement scale 350 (FIG. 10) and/or training data 370, 372 (FIGS. 11A-11B) and/or 400, 410 (FIG. 12).

In the illustrated example, the computing system 1300 can include a network 1310 that can facilitate communication between the server 1306, computing device 1302, display 1308 and input device 1312. The display 1308 (e.g., audio and/or visual interface) can present a browser to a user and can be connected with the server 1306 and/or computing device 1302. The input device 1312 can receive user inputs (e.g., audio questions, keyboard typing, etc.). A user detector 1314 can detect physical characteristics of a user (e.g., heart rate, eye characteristics, pupil dilation, breathing rate, etc.).

A computing device 1302 includes a processor 1302*a* (e.g., embedded controller, central processing unit/CPU) and a memory 1302*b* (e.g., non-volatile memory/NVM and/or volatile memory) containing a set of instructions, which when executed by the processor 1302*a*, cause the computing device 1302 to implement aspects described herein, for example causing a computer to execute a telecommunication session and allow for bidirectional communication with a service provider.

A server 1306 includes a processor 1306*a* (e.g., embedded controller, central processing unit/CPU) and a memory 1306*b* (e.g., non-volatile memory/NVM and/or volatile memory) containing a set of instructions, which when executed by the processor 1306*a*, cause the server 1306 to implement aspects described herein, for example identifying an emotional state of the user and adjusting the telecommunication session based on the emotional state. In some examples, the server 1304 can further control a chatbot and/or digital human that is the service provider of the teleservice session. In further examples, another computing device can be provided when the service provider is a human.

Example systems and methods for clarity in a telehealth system are described herein. The providers described herein may be healthcare providers and the consumers may be patients in some embodiments for ease of illustration and explanation, although not all embodiments of the inventive subject matter are limited to healthcare services. One or more embodiments may be used in connection with other types of remote services, such as legal counseling, financial advisement services, retail sales, computer troubleshooting, computer engineering, or the like. The healthcare providers and patients may interact with each other via a videoconference or teleconference channel (e.g., using electronic communication devices connected over a communication network or channel). Patients may access the telehealth system via an electronic communication device such as a mobile phone, tablet computer, laptop computer, desktop computer, smart television, or the like. The patients can be placed into a virtual waiting room, such as an electronically managed list of patients waiting to interact with a healthcare provider. A telehealth session may be initiated between patients and healthcare providers on a first-come, first-served basis. For each patient, the telehealth system can provide a first group or pool of the providers. If there are more patients waiting in the virtual waiting room than there are available providers, then there may be some patients that are required to continue waiting in the virtual waiting room until telehealth sessions between providers and other patients are completed (and the providers in the first pool or group are free to initiate a telehealth session with the patients that are still waiting).

FIG. 14 is a block diagram 1400 of an example service of enhanced teleservice process/system that may be deployed within the enhanced teleservice process 100 of FIGS. 1A-1B), according to some examples. Training input 1410 includes model parameters 1412 and training data 1420, which may include paired training data sets 1422 (e.g., input-output training pairs) and constraints 1426. Model parameters 1412 store or provide the parameters or coefficients of corresponding ones of machine learning models. During training, these parameters 1412 are adapted based on the input-output training pairs of the training data sets 1422. After the parameters 1412 are adapted (after training), the parameters are used by trained models 1460 to implement the trained machine learning models on a new set of data 1470.

Training data 1420 includes constraints 1426 which may define the constraints of a given patient information features. The paired training data sets 1422 may include sets of input-output pairs, such as pairs of a plurality of training virtual telehealth encounter transcription features and features of post patient encounter documents that are created in association with one or more of the training transcriptions (e.g., ground-truth patient encounter documents of telehealth encounters). Some components of training input 1410 may be stored separately at a different off-site facility or facilities than other components.

Machine learning model(s) training 1430 trains one or more machine learning techniques based on the sets of input-output pairs of paired training data sets 1422. For example, the model training 1430 may train the machine learning (ML) model parameters 1412 by minimizing a loss function based on one or more ground-truth patient encounter documents generated in association with a training transcription. The ML model can include any one or combination of classifiers or neural networks, such as an artificial neural network, a convolutional neural network, an adversarial network, a generative adversarial network, a deep feed forward network, a radial basis network, a recurrent neural network, a long/short term memory network, a gated recurrent unit, an auto encoder, a variational autoencoder, a denoising autoencoder, a sparse autoencoder, a Markov chain, a Hopfield network, a Boltzmann machine, a restricted Boltzmann machine, a deep belief network, a deep convolutional network, a deconvolutional network, a deep convolutional inverse graphics network, a liquid state machine, an extreme learning machine, an echo state network, a deep residual network, a Kohonen network, a support vector machine, a neural Turing machine, an LLM, a generative network, a diffusion model, and the like.

Particularly, the ML model can be applied to a training batch of transcription features to estimate or generate one or more preliminary patient encounter documents. In some implementations, a derivative of a loss function is computed based on a comparison of the preliminary patient encounter documents and the ground truth patient encounter documents associated with the training transcription features and parameters of the ML model are updated based on the computed derivative of the loss function.

The result of minimizing the loss function for multiple sets of training data trains, adapts, or optimizes the model parameters 1412 of the corresponding ML models. In this way, the ML model is trained to establish a relationship between a plurality of training transcriptions and ground-truth patient encounter documents associated with the training transcriptions.

After the machine learning model is trained, new data 1470, including one or more transcriptions of a virtual clinical encounter features are received and/or derived by the enhanced teleservice process 100. The trained machine learning model may be applied to the new data 1470 to generate results 1480 including a prediction of preliminary patient encounter documents. The preliminary patient encounter documents can be represented in a GUI, such as in a prompt overlaid on the GUI allowing a clinician to selectively include or exclude portions of the preliminary patient encounter documents in a final patient encounter document.

FIG. 15 is a functional block diagram of an example neural network 1502 that can be used for the inference engine or other functions (e.g., engines) as described herein to produce a predictive model. The predictive model can identify or generate a prediction of one or more preliminary post patient encounter document in association with one or more transcripts of a clinical encounter. In an example, the neural network 1502 can be a LSTM neural network. In an example, the neural network 1502 can be a recurrent neural network (RNN). The example neural network 1502 may be used to implement the machine learning as described herein, and various implementations may use other types of machine learning networks. The neural network 1502 includes an input layer 1504, a hidden layer 1508, and an output layer 1512. The input layer 1504 includes inputs 1504a, 1504b . . . 1504n. The hidden layer 1508 includes neurons 1508a, 1508b . . . 1508n. The output layer 1512 includes outputs 1512a, 1512b . . . 1512n.

Each neuron of the hidden layer 1508 receives an input from the input layer 1504 and outputs a value to the corresponding output in the output layer 1512. For example, the neuron 1508a receives an input from the input 1504a and outputs a value to the output 1512a. Each neuron, other than the neuron 1508a, also receives an output of a previous neuron as an input. For example, the neuron 1508b receives inputs from the input 1504b and the output 1512a. In this way the output of each neuron is fed forward to the next neuron in the hidden layer 1508. The last output 1512n in the output layer 1512 outputs a probability associated with the inputs 1504a-1504n. Although the input layer 1504, the hidden layer 1508, and the output layer 1512 are depicted as each including three elements, each layer may contain any number of elements. Neurons can include one or more adjustable parameters, weights, rules, criteria, or the like.

In various implementations, each layer of the neural network 1502 must include the same number of elements as each of the other layers of the neural network 1502. For example, training GUI features (e.g., fields of a GUI presented to an operator) may be processed to create the inputs 1504a-1504n. The neural network 1502 may implement a model to produce one or more preliminary post patient encounter document in association with the transcript features. More specifically, the inputs 1504a-1504n can include fields of the transcript as data features (binary, vectors, factors or the like) stored in the storage device. The fields of the transcript as data features can be provided to neurons 1508a-1508n for analysis and connections between the known facts. The neurons 1508a-1508n, upon finding connections, provides the potential connections as outputs to the output layer 1512, which determines a preliminary post patient encounter document.

The neural network 1502 can perform any of the above calculations. The output of the neural network 1502 can be used to trigger display of a prompt that includes the preliminary post patient encounter document in a GUI. For example, the prompt (e.g., notification) can be provided to a PBM, health plan manager, pharmacy, physician, clinician, caregiver, and/or a patient.

In some examples, a convolutional neural network may be implemented. Similar to neural networks, convolutional neural networks include an input layer, a hidden layer, and an output layer. However, in a convolutional neural network, the output layer includes one fewer output than the number of neurons in the hidden layer and each neuron is connected to each output. Additionally, each input in the input layer is connected to each neuron in the hidden layer. In other words, input 1504a is connected to each of neurons 1508a, 1508b . . . 1508n.

The present systems and methods can process the audio component of the telehealth encounter to assist in determining the emotional state of the patient or user. The audio signal of a communication session between a patient-related client device and a provider client device can be processed in essentially real time. The audio signal is processed to separate the audio caller (patient) utterance to generate an identified task based on the transcribed caller utterance. The audio caller utterance is parsed into a plurality of samples of the audio caller utterance(s). The samples can be processed to generate a loudness result based on loudness values of the plurality of samples using a loudness neural network associated with the identified task that is occurring in the telehealth visit. The samples can be processed to identify a pitch result based on pitch values of the plurality of samples using a pitch neural network associated with the identified task that is occurring in the telehealth visit. The samples can be processed to identify a tone result for a plurality of words in the transcribed caller utterance using a tone neural network associated with the identified task that is occurring in the telehealth visit. The emotional state of the patient or the probability of an emotional state of the patient can be determined using the emotional state neural network (generative AI engine) associated with the telehealth visit. The emotional state neural network can receive the loudness result, the pitch result, the tone result, or combinations thereof to determine the emotional state of the patient. The present system can use systems and methods from U.S. Pat. No. 11,031,013, which is assigned to the present assignee and incorporated herein by reference.

"COMPONENT" in this context refers to a device, physical entity, or logic having boundaries defined by function or subroutine calls, branch points, APIs, or other technologies that provide for the partitioning or modularization of particular processing or control functions. Components may be combined via their interfaces with other components to carry out a machine process. A component may be a packaged functional hardware unit designed for use with other components and a part of a program that usually performs a particular function of related functions. Components may constitute either software components (e.g., code embodied on a machine-readable medium) or hardware components. A "hardware component" is a tangible unit capable of performing certain operations and may be configured or arranged in a certain physical manner. In various example embodiments, one or more computer systems (e.g., a stand-alone computer system, a client computer system, or a server computer system) or one or more hardware components of a computer system (e.g., a processor or a group of processors) may be configured by software (e.g., an application or application portion) as a hardware component that operates to perform certain operations as described herein.

A hardware component may also be implemented mechanically, electronically, or any suitable combination thereof. For example, a hardware component may include dedicated circuitry or logic that is permanently configured to perform certain operations. A hardware component may be a special-purpose processor, such as a Field-Programmable Gate Array (FPGA) or an ASIC. A hardware component may also include programmable logic or circuitry that is temporarily configured by software to perform certain operations. For example, a hardware component may include software executed by a general-purpose processor or other programmable processor. Once configured by such software, hardware components become specific machines (or specific components of a machine) uniquely tailored to perform the configured functions and are no longer general-purpose processors. It will be appreciated that the decision to implement a hardware component mechanically, in dedicated and permanently configured circuitry, or in temporarily configured circuitry (e.g., configured by software) may be driven by cost and time considerations. Accordingly, the phrase "hardware component" (or "hardware-implemented component") should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware components are temporarily configured (e.g., programmed), each of the hardware components need not be configured or instantiated at any one instance in time. For example, where a hardware component includes a general-purpose processor configured by software to become a special-purpose processor, the general-purpose processor may be configured as respectively different special-purpose processors (e.g., comprising different hardware components) at different times. Software accordingly configures a particular processor or processors, for example, to constitute a particular hardware component at one instance of time and to constitute a different hardware component at a different instance of time.

Hardware components can provide information to, and receive information from, other hardware components. Accordingly, the described hardware components may be regarded as being communicatively coupled. Where multiple hardware components exist contemporaneously, communications may be achieved through signal transmission (e.g., over appropriate circuits and buses) between or among two or more of the hardware components. In embodiments in which multiple hardware components are configured or instantiated at different times, communications between such hardware components may be achieved, for example, through the storage and retrieval of information in memory structures to which the multiple hardware components have access. For example, one hardware component may perform an operation and store the output of that operation in a memory device to which it is communicatively coupled. A further hardware component may then, at a later time, access the memory device to retrieve and process the stored output.

Hardware components may also initiate communications with input or output devices and can operate on a resource (e.g., a collection of information). The various operations of example methods described herein may be performed, at least partially, by one or more processors that are temporarily configured (e.g., by software) or permanently configured to perform the relevant operations. Whether temporarily or permanently configured, such processors may constitute processor-implemented components that operate to perform one or more operations or functions described herein. As used herein, "processor-implemented component" refers to a hardware component implemented using one or more processors. Similarly, the methods described herein may be at least partially processor-implemented, with a particular processor or processors being an example of hardware. For example, at least some of the operations of a method may be performed by one or more processors or processor-implemented components. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an API). The performance of certain of the operations may be distributed among the processors, not only residing within a single machine, but deployed across a number of machines. In some example embodiments, the processors or processor-implemented components may be located in a single geographic location (e.g., within a home environment, an office environment, or a server farm). In other example embodiments, the processors or processor-implemented components may be distributed across a number of geographic locations.

The term "coupled" can be used herein to refer to any type of relationship, direct or indirect, between the components in question, and can apply to electrical, mechanical, fluid, optical, electromagnetic, electromechanical or other connections. In addition, the terms "first", "second", etc. can be used herein only to facilitate discussion, and carry no particular temporal or chronological significance unless otherwise indicated.

The terms "weight" and "weighting" and words of similar import can mean, in some embodiments, emphasizing the contribution of a particular inputs (e.g., data, words, variables, and the like) over other inputs. Each member in a data set may not contribute equally to the analysis, the intermediate processing, or the result, relative to the other members. Some members may make a greater contribution to the analysis, the intermediate processing, or the result.

Those skilled in the art will appreciate from the foregoing description that the broad techniques of the embodiments of the present disclosure can be implemented in a variety of forms. Therefore, while the embodiments of this disclosure have been described in connection with particular examples thereof, the true scope of the embodiments of the disclosure should not be so limited since other modifications will become apparent to the skilled practitioner upon a study of the drawings, specification, and following claims.

We claim:

1. A computing system comprising:
a processor; and
a memory having a set of instructions, which when executed by the processor, cause the computing system to:
provide first content to a first computing device to be presented on the first computing device as part of a telecommunication session associated with a first user;
receive telecommunication data from the first computing device as part of the telecommunication session;
identify a user characteristic of the first user based on the telecommunication data, wherein the user characteristic is associated with the first content presented on the first computing device, wherein the user characteristic is one or more of a physical characteristic of the first user or an audio characteristic of the first user;
measure an emotional response of the first user based on the user characteristic;
automatically adjust a parameter of the telecommunication session based on the emotional response;
identify a category of the first content;
determine a level of understanding of the category by the first user;
determine one or more of second content to be presented to the first user based on the level of understanding and the user characteristic, or third content to be presented to a second user associated with the telecommunication session based on the level of understanding and the user characteristic; and
provide one or more of the second content to the first computing device, or the third content to a second computing device associated with the second user.

2. The computing system of claim 1, wherein to adjust the parameter of the telecommunication session, the instructions of the memory, when executed, cause the computing system to:
one or more of provide a first overlay on a first graphical user interface of the first computing device that corresponds to the second content, or provide a second overlay on a second graphical user interface of the second computing device that corresponds to the third content.

3. The computing system of claim 1, wherein the instructions of the memory, when executed, cause the computing system to:
generate the first content with an artificial intelligence model;
generate, with the artificial intelligence model, an output based on the emotional response; and
cause the output to be presented on the first computing device during the telecommunication session.

4. The computing system of claim 3, wherein the output corresponds to one or more of a digital human presented on the first computing device, or a chatbot presented on the first computing device.

5. The computing system of claim 1, wherein the instructions of the memory, when executed, cause the computing system to:
determine a time stamp for one or more of a moment of confusion of the first user or a moment of anxiety of the first user based on the user characteristic, wherein the one or more of the moment of confusion or the moment of anxiety is the emotional response;
identify a portion of the first content based on the time stamp; and
identify mitigation information based on the portion to mitigate the emotional response,
wherein to adjust the telecommunication session, the instructions of the memory, when executed, cause the computing system to provide the mitigation information to the first computing device as part of the telecommunication session.

6. The computing system of claim 5, wherein the instructions of the memory, when executed, cause the computing system to:
identify a level of understanding of the first content by the first user;
access a synonym map that associates equivalent terms with each other;
identify one or more synonyms for the portion based on the synonym map and the level of understanding; and
generate the mitigation information to include the one or more synonyms,
wherein the user characteristic is one or more of a heart rate of the first user, pupil dilation of the first user, breathing rate of the first user, temperature of the first user, blood pressure of the first user, mouth activity of the first user, head motion of the first user or vocal quality of the first user.

7. At least one non-transitory computer readable storage medium comprising a set of instructions, which when executed by a computing system, cause the computing system to:
provide first content to a first computing device to be presented on the first computing device as part of a telecommunication session associated with a first user;
receive telecommunication data from the first computing device as part of the telecommunication session;
identify a user characteristic of the first user based on the telecommunication data, wherein the user characteristic is associated with the first content presented on the first computing device, wherein the user characteristic is one or more of a physical characteristic of the first user or an audio characteristic of the first user;
measure an emotional response of the first user based on the user characteristic;
automatically adjust a parameter of the telecommunication session based on the emotional response;
identify a category of the first content;
determine a level of understanding of the category by the first user;
determine one or more of second content to be presented to the first user based on the level of understanding and the user characteristic, or third content to be presented to a second user associated with the telecommunication session based on the level of understanding and the user characteristic; and provide one or more of the second content to the first computing device, or the third content to a second computing device associated with the second user.

8. The at least one non-transitory computer readable storage medium of claim 7, wherein to adjust the parameter of the telecommunication session, the instructions, when executed, cause the computing system to:

one or more of provide a first overlay on a first graphical user interface of the first computing device that corresponds to the second content, or provide a second overlay on a second graphical user interface of the second computing device that corresponds to the third content.

9. The at least one non-transitory computer readable storage medium of claim 7, wherein the instructions, when executed, cause the computing system to:

generate the first content with an artificial intelligence model;

generate, with the artificial intelligence model, an output based on the emotional response; and cause the output to be presented on the first computing device during the telecommunication session.

10. The at least one non-transitory computer readable storage medium of claim 9, wherein the output corresponds to one or more of a digital human presented on the first computing device, or a chatbot presented on the first computing device.

11. The at least one non-transitory computer readable storage medium of claim 7, wherein the instructions, when executed, cause the computing system to:

determine a time stamp for one or more of a moment of confusion of the first user or a moment of anxiety of the first user based on the user characteristic, wherein the one or more of the moment of confusion or the moment of anxiety is the emotional response;

identify a portion of the first content based on the time stamp; and identify mitigation information based on the portion to mitigate the emotional response, wherein to adjust the telecommunication session, the instructions, when executed, cause the computing system to provide the mitigation information to the first computing device as part of the telecommunication session.

12. The at least one non-transitory computer readable storage medium of claim 11, wherein the instructions, when executed, cause the computing system to:

identify a level of understanding of the first content by the first user;

access a synonym map that associates equivalent terms with each other;

identify one or more synonyms for the portion based on the synonym map and the level of understanding; and generate the mitigation information to include the one or more synonyms, wherein the user characteristic is one or more of a heart rate of the first user, pupil dilation of the first user, breathing rate of the first user, temperature of the first user, blood pressure of the first user, mouth activity of the first user, head motion of the first user or vocal quality of the first user.

13. A method comprising:

providing first content to a first computing device to be presented on the first computing device as part of a telecommunication session associated with a first user;

receiving telecommunication data from the first computing device as part of the telecommunication session;

identifying a user characteristic of the first user based on the telecommunication data, wherein the user characteristic is associated with the first content presented on the first computing device, wherein the user characteristic is one or more of a physical characteristic of the first user or an audio characteristic of the first user;

measuring an emotional response of the first user based on the user characteristic;

automatically adjusting a parameter of the telecommunication session based on the emotional response;

identifying a category of the first content;

determining a level of understanding of the category by the first user;

determining one or more of second content to be presented to the first user based on the level of understanding and the user characteristic, or third content to be presented to a second user associated with the telecommunication session based on the level of understanding and the user characteristic; and providing one or more of the second content to the first computing device, or the third content to a second computing device associated with the second user.

14. The method of claim 13, wherein the adjusting comprises:

one or more of providing a first overlay on a first graphical user interface of the first computing device that corresponds to the second content, or providing a second overlay on a second graphical user interface of the second computing device that corresponds to the third content.

15. The method of claim 13, comprising:

generating the first content with an artificial intelligence model;

generating, with the artificial intelligence model, an output based on the emotional response; and causing the output to be presented on the first computing device during the telecommunication session.

16. The method of claim 15, wherein the output corresponds to one or more of a digital human presented on the first computing device, or a chatbot presented on the first computing device.

17. The method of claim 13, comprising:

determining a time stamp for one or more of a moment of confusion of the first user or a moment of anxiety of the first user based on the user characteristic, wherein the one or more of the moment of confusion or the moment of anxiety is the emotional response;

identifying a portion of the first content based on the time stamp; and identifying mitigation information based on the portion to mitigate the emotional response;

identifying a level of understanding of the first content by the first user;

accessing a synonym map that associates equivalent terms with each other;

identifying one or more synonyms for the portion based on the synonym map and the level of understanding; and generating the mitigation information to include the one or more synonyms, wherein the user characteristic is one or more of a heart rate of the first user, pupil dilation of the first user, breathing rate of the first user, temperature of the first user, blood pressure of the first user, mouth activity of the first user, head motion of the first user or vocal quality of the first user, and wherein the adjusting comprises providing the mitigation information to the first computing device as part of the telecommunication session.

* * * * *